(12) United States Patent
McBride et al.

(10) Patent No.: US 8,677,744 B2
(45) Date of Patent: Mar. 25, 2014

(54) FLUID CIRCULATION IN ENERGY STORAGE AND RECOVERY SYSTEMS

(75) Inventors: Troy O. McBride, Norwich, VT (US); Benjamin R. Bollinger, Windsor, VT (US)

(73) Assignee: SustaioX, Inc., Seabrook, NH (US)

( * ) Notice: Subject to any disclaimer, the term of this patent is extended or adjusted under 35 U.S.C. 154(b) by 263 days.

(21) Appl. No.: 13/234,239

(22) Filed: Sep. 16, 2011

(65) Prior Publication Data

US 2012/0036851 A1 Feb. 16, 2012

Related U.S. Application Data

(63) Continuation-in-part of application No. 12/966,773, filed on Dec. 13, 2010, now Pat. No. 8,122,718, which is a continuation of application No. 12/690,513, filed on Jan. 20, 2010, now Pat. No. 7,958,731, and a continuation-in-part of application No. 12/639,703, filed on Dec. 16, 2009, now Pat. No. 8,225,606, which is a continuation-in-part of application No. 12/421,057, filed on Apr. 9, 2009, now Pat. No. 7,832,207, said application No. 12/639,703 is a continuation-in-part of application No. 12/481,235, filed on Jun. 9, 2009, now Pat. No. 7,802,426.

(60) Provisional application No. 61/384,814, filed on Sep. 21, 2010, provisional application No. 61/494,473, filed on Jun. 8, 2011, provisional application No. 61/145,860, filed on Jan. 20, 2009, provisional application No. 61/145,864, filed on Jan. 20, 2009, provisional application No. 61/146,432, filed on Jan. 22, 2009, provisional application No. 61/148,481, filed on Jan. 30, 2009, provisional application No. 61/151,332, filed on Feb. 10, 2009, provisional application No. 61/227,222, filed on Jul. 21, 2009, provisional application No. 61/256,576, filed on Oct. 30, 2009, provisional application No. 61/264,317, filed on Nov. 25, 2009, provisional application No. 61/266,758, filed on Dec. 4, 2009, provisional application No. 61/148,691, filed on Jan. 30, 2009, provisional application No. 61/043,630, filed on Apr. 9, 2008, provisional application No. 61/059,964, filed on Jun. 9, 2008, provisional application No. 61/166,448, filed on Apr. 3, 2009, provisional application No. 61/184,166, filed on Jun. 4, 2009, provisional application No. 61/223,564, filed on Jul. 7, 2009, provisional application No. 61/251,965, filed on Oct. 15, 2009.

(51) Int. Cl.
*F01K 1/00* (2006.01)
*F02G 1/04* (2006.01)

(52) U.S. Cl.
USPC .............................................. 60/508; 60/659

(58) Field of Classification Search
USPC ...... 60/508–515, 659; 91/4 A, 4 R; 92/1, 144
See application file for complete search history.

(56) References Cited

U.S. PATENT DOCUMENTS

| | | | |
|---|---|---|---|
| 114,297 A | 5/1871 | Ivens et al. |
| 224,081 A | 2/1880 | Eckart |
| 233,432 A | 10/1880 | Pitchford |
| 1,353,216 A | 9/1920 | Carlson |
| 1,635,524 A | 7/1927 | Aikman |
| 1,681,280 A | 8/1928 | Bruckner |
| 2,025,142 A | 12/1935 | Zahm et al. |
| 2,042,991 A | 6/1936 | Harris, Jr. |
| 2,141,703 A | 12/1938 | Bays |
| 2,280,100 A | 4/1942 | Singleton |
| 2,280,845 A | 4/1942 | Parker |
| 2,404,660 A | 7/1946 | Rouleau |
| 2,420,098 A | 5/1947 | Rouleau |
| 2,486,081 A | 10/1949 | Weenen |
| 2,539,862 A | 1/1951 | Rushing |
| 2,628,564 A | 2/1953 | Jacobs |
| 2,632,995 A | 3/1953 | Noe |
| 2,712,728 A | 7/1955 | Lewis et al. |
| 2,813,398 A | 11/1957 | Wilcox |
| 2,829,501 A | 4/1958 | Walls |
| 2,880,759 A | 4/1959 | Wisman |
| 3,041,842 A | 7/1962 | Heinecke |

| | | | | | | |
|---|---|---|---|---|---|---|
| 3,100,965 | A | 8/1963 | Blackburn | 4,209,982 A | 7/1980 | Pitts |
| 3,192,705 | A | 7/1965 | Miller | 4,220,006 A | 9/1980 | Kindt |
| 3,236,512 | A | 2/1966 | Caslav et al. | 4,229,143 A | 10/1980 | Pucher |
| 3,237,847 | A | 3/1966 | Wilson | 4,229,661 A | 10/1980 | Mead et al. |
| 3,269,121 | A | 8/1966 | Ludwig | 4,232,253 A | 11/1980 | Mortelmans |
| 3,538,340 | A * | 11/1970 | Lang ............................ 290/52 | 4,237,692 A | 12/1980 | Ahrens et al. |
| 3,608,311 | A * | 9/1971 | Roesel, Jr. ...................... 60/516 | 4,242,878 A | 1/1981 | Brinkerhoff |
| 3,648,458 | A | 3/1972 | McAlister | 4,246,978 A | 1/1981 | Schulz et al. |
| 3,650,636 | A | 3/1972 | Eskeli | 4,262,735 A | 4/1981 | Courrege |
| 3,672,160 | A | 6/1972 | Kim | 4,273,514 A | 6/1981 | Shore et al. |
| 3,677,008 | A | 7/1972 | Koutz | 4,274,010 A | 6/1981 | Lawson-Tancred |
| 3,704,079 | A | 11/1972 | Berlyn | 4,275,310 A | 6/1981 | Summers et al. |
| 3,750,391 | A | 8/1973 | Roblyer | 4,281,256 A | 7/1981 | Ahrens |
| 3,757,517 | A | 9/1973 | Rigollot | 4,293,323 A | 10/1981 | Cohen |
| 3,793,848 | A | 2/1974 | Eskeli | 4,299,198 A | 11/1981 | Woodhull |
| 3,801,793 | A | 4/1974 | Goebel | 4,302,684 A | 11/1981 | Gogins |
| 3,803,847 | A | 4/1974 | McAlister | 4,304,103 A | 12/1981 | Hamrick |
| 3,839,863 | A | 10/1974 | Frazier | 4,311,011 A | 1/1982 | Lewis |
| 3,847,182 | A | 11/1974 | Greer | 4,316,096 A | 2/1982 | Syverson |
| 3,895,493 | A | 7/1975 | Rigollot | 4,317,439 A | 3/1982 | Emmerling |
| 3,903,696 | A | 9/1975 | Carman | 4,335,867 A | 6/1982 | Bihlmaier |
| 3,935,469 | A | 1/1976 | Haydock | 4,340,822 A | 7/1982 | Gregg |
| 3,939,356 | A | 2/1976 | Loane | 4,341,072 A | 7/1982 | Clyne |
| 3,942,323 | A | 3/1976 | Maillet | 4,348,863 A | 9/1982 | Taylor et al. |
| 3,945,207 | A | 3/1976 | Hyatt | 4,353,214 A | 10/1982 | Gardner |
| 3,948,049 | A | 4/1976 | Ohms et al. | 4,354,420 A | 10/1982 | Bianchetta |
| 3,952,516 | A | 4/1976 | Lapp | 4,355,956 A | 10/1982 | Ringrose et al. |
| 3,952,723 | A | 4/1976 | Browning | 4,358,250 A | 11/1982 | Payne |
| 3,958,899 | A | 5/1976 | Coleman, Jr. et al. | 4,367,786 A | 1/1983 | Hafner et al. |
| 3,986,354 | A | 10/1976 | Erb | 4,368,692 A | 1/1983 | Kita |
| 3,988,592 | A | 10/1976 | Porter | 4,368,775 A | 1/1983 | Ward |
| 3,988,897 | A | 11/1976 | Strub | 4,370,559 A | 1/1983 | Langley, Jr. |
| 3,990,246 | A | 11/1976 | Wilmers | 4,372,114 A | 2/1983 | Burnham |
| 3,991,574 | A | 11/1976 | Frazier | 4,375,387 A | 3/1983 | deFilippi et al. |
| 3,996,741 | A | 12/1976 | Herberg | 4,380,419 A | 4/1983 | Morton |
| 3,998,049 | A | 12/1976 | McKinley et al. | 4,392,062 A | 7/1983 | Bervig |
| 3,999,388 | A | 12/1976 | Nystrom | 4,393,752 A | 7/1983 | Meier |
| 4,008,006 | A | 2/1977 | Bea | 4,411,136 A | 10/1983 | Funk |
| 4,027,993 | A | 6/1977 | Wolff | 4,416,114 A | 11/1983 | Martini |
| 4,030,303 | A | 6/1977 | Kraus et al. | 4,421,661 A | 12/1983 | Claar et al. |
| 4,031,702 | A | 6/1977 | Burnett et al. | 4,428,711 A | 1/1984 | Archer |
| 4,031,704 | A | 6/1977 | Moore et al. | 4,435,131 A | 3/1984 | Ruben |
| 4,041,708 | A | 8/1977 | Wolff | 4,444,011 A | 4/1984 | Kolin |
| 4,050,246 | A | 9/1977 | Bourquardez | 4,446,698 A | 5/1984 | Benson |
| 4,055,950 | A | 11/1977 | Grossman | 4,447,738 A | 5/1984 | Allison |
| 4,055,951 | A | 11/1977 | Davoud et al. | 4,449,372 A | 5/1984 | Rilett |
| 4,058,979 | A | 11/1977 | Germain | 4,452,046 A | 6/1984 | Valentin |
| 4,075,844 | A | 2/1978 | Schiferli | 4,452,047 A | 6/1984 | Hunt et al. |
| 4,089,744 | A | 5/1978 | Cahn | 4,454,429 A | 6/1984 | Buonome |
| 4,094,356 | A | 6/1978 | Ash et al. | 4,454,720 A | 6/1984 | Leibowitz |
| 4,095,118 | A | 6/1978 | Rathbun | 4,455,834 A | 6/1984 | Earle |
| 4,100,745 | A | 7/1978 | Gyarmathy et al. | 4,462,213 A | 7/1984 | Lewis |
| 4,104,955 | A | 8/1978 | Murphy | 4,474,002 A | 10/1984 | Perry |
| 4,108,077 | A | 8/1978 | Laing | 4,476,851 A | 10/1984 | Brugger et al. |
| 4,109,465 | A | 8/1978 | Plen | 4,478,553 A | 10/1984 | Leibowitz et al. |
| 4,110,987 | A | 9/1978 | Cahn et al. | 4,489,554 A | 12/1984 | Otters |
| 4,112,311 | A | 9/1978 | Theyse | 4,491,739 A | 1/1985 | Watson |
| 4,117,342 | A | 9/1978 | Melley, Jr. | 4,492,539 A | 1/1985 | Specht |
| 4,117,696 | A | 10/1978 | Fawcett et al. | 4,493,189 A | 1/1985 | Slater |
| 4,118,637 | A | 10/1978 | Tackett | 4,496,847 A | 1/1985 | Parkins |
| 4,124,182 | A | 11/1978 | Loeb | 4,498,848 A | 2/1985 | Petrovsky |
| 4,126,000 | A | 11/1978 | Funk | 4,502,284 A | 3/1985 | Chrisoghilos |
| 4,136,432 | A | 1/1979 | Melley, Jr. | 4,503,673 A | 3/1985 | Schachle |
| 4,142,368 | A | 3/1979 | Mantegani | 4,514,979 A | 5/1985 | Mohr |
| 4,147,204 | A | 4/1979 | Pfenninger | 4,515,516 A | 5/1985 | Perrine et al. |
| 4,149,092 | A | 4/1979 | Cros | 4,520,840 A | 6/1985 | Michel |
| 4,150,547 | A | 4/1979 | Hobson | 4,525,631 A | 6/1985 | Allison |
| 4,154,292 | A | 5/1979 | Herrick | 4,530,208 A | 7/1985 | Sato |
| 4,167,372 | A | 9/1979 | Tackett | 4,547,209 A | 10/1985 | Netzer |
| 4,170,878 | A | 10/1979 | Jahnig | 4,574,592 A | 3/1986 | Eskeli |
| 4,173,431 | A | 11/1979 | Smith | 4,585,039 A | 4/1986 | Hamilton |
| 4,189,925 | A | 2/1980 | Long | 4,589,475 A | 5/1986 | Jones |
| 4,194,889 | A | 3/1980 | Wanner | 4,593,202 A | 6/1986 | Dickinson |
| 4,195,481 | A | 4/1980 | Gregory | 4,619,225 A | 10/1986 | Lowther |
| 4,197,700 | A | 4/1980 | Jahnig | 4,624,623 A | 11/1986 | Wagner |
| 4,197,715 | A | 4/1980 | Fawcett et al. | 4,648,801 A | 3/1987 | Wilson |
| 4,201,514 | A | 5/1980 | Huetter | 4,651,525 A | 3/1987 | Cestero |
| 4,204,126 | A | 5/1980 | Diggs | 4,653,986 A | 3/1987 | Ashton |
| 4,206,608 | A | 6/1980 | Bell | 4,671,742 A | 6/1987 | Gyimesi |

| | | | | | | |
|---|---|---|---|---|---|---|
| 4,676,068 A | 6/1987 | Funk | | 5,537,822 A | 7/1996 | Shnaid et al. |
| 4,679,396 A | 7/1987 | Heggie | | 5,544,698 A | 8/1996 | Paulman |
| 4,691,524 A | 9/1987 | Holscher | | 5,557,934 A | 9/1996 | Beach |
| 4,693,080 A | 9/1987 | Van Hooff | | 5,561,978 A | 10/1996 | Buschur |
| 4,706,456 A | 11/1987 | Backe | | 5,562,010 A | 10/1996 | McGuire |
| 4,707,988 A | 11/1987 | Palmers | | 5,579,640 A | 12/1996 | Gray, Jr. et al. |
| 4,710,100 A | 12/1987 | Laing et al. | | 5,584,664 A | 12/1996 | Elliott et al. |
| 4,735,552 A | 4/1988 | Watson | | 5,592,028 A | 1/1997 | Pritchard |
| 4,738,101 A * | 4/1988 | Kubik ............................ 60/413 | | 5,595,587 A | 1/1997 | Steed |
| 4,739,620 A | 4/1988 | Pierce | | 5,598,736 A | 2/1997 | Erskine |
| 4,751,818 A * | 6/1988 | Kubik ............................ 60/444 | | 5,599,172 A | 2/1997 | Mccabe |
| 4,760,697 A | 8/1988 | Heggie | | 5,600,953 A | 2/1997 | Oshita et al. |
| 4,761,118 A | 8/1988 | Zanarini et al. | | 5,616,007 A | 4/1997 | Cohen |
| 4,765,142 A | 8/1988 | Nakhamkin | | 5,634,340 A | 6/1997 | Grennan |
| 4,765,143 A | 8/1988 | Crawford et al. | | 5,641,273 A | 6/1997 | Moseley |
| 4,767,938 A | 8/1988 | Bervig | | 5,674,053 A | 10/1997 | Paul et al. |
| 4,792,700 A | 12/1988 | Ammons | | 5,685,154 A | 11/1997 | Bronicki et al. |
| 4,849,648 A | 7/1989 | Longardner | | 5,685,155 A | 11/1997 | Brown |
| 4,870,816 A | 10/1989 | Nakhamkin | | 5,768,893 A | 6/1998 | Hoshino et al. |
| 4,872,307 A | 10/1989 | Nakhamkin | | 5,769,610 A | 6/1998 | Paul et al. |
| 4,873,828 A | 10/1989 | Laing et al. | | 5,771,693 A | 6/1998 | Coney |
| 4,873,831 A | 10/1989 | Dehne | | 5,775,107 A | 7/1998 | Sparkman |
| 4,876,992 A | 10/1989 | Sobotowski | | 5,778,669 A * | 7/1998 | Kubik ............................ 60/413 |
| 4,877,530 A | 10/1989 | Moses | | 5,778,675 A | 7/1998 | Nakhamkin |
| 4,885,912 A | 12/1989 | Nakhamkin | | 5,794,442 A | 8/1998 | Lisniansky |
| 4,886,534 A | 12/1989 | Castan | | 5,797,980 A | 8/1998 | Fillet |
| 4,907,495 A | 3/1990 | Sugahara | | 5,819,533 A | 10/1998 | Moonen |
| 4,936,109 A | 6/1990 | Longardner | | 5,819,635 A | 10/1998 | Moonen |
| 4,942,736 A | 7/1990 | Bronicki | | 5,831,757 A | 11/1998 | DiFrancesco |
| 4,947,977 A | 8/1990 | Raymond | | 5,832,728 A | 11/1998 | Buck |
| 4,955,195 A | 9/1990 | Jones et al. | | 5,832,906 A | 11/1998 | Douville et al. |
| 4,984,432 A | 1/1991 | Corey | | 5,839,270 A | 11/1998 | Jirnov et al. |
| 5,016,441 A | 5/1991 | Pinto | | 5,845,479 A | 12/1998 | Nakhamkin |
| 5,048,292 A * | 9/1991 | Kubik ............................ 60/413 | | 5,863,186 A | 1/1999 | Green et al. |
| 5,056,601 A | 10/1991 | Grimmer | | 5,873,250 A | 2/1999 | Lewis |
| 5,058,385 A | 10/1991 | Everett, Jr. | | 5,901,809 A | 5/1999 | Berkun |
| 5,062,498 A | 11/1991 | Tobias | | 5,924,283 A | 7/1999 | Burke, Jr. |
| 5,107,681 A | 4/1992 | Wolfbauer, III | | 5,934,063 A | 8/1999 | Nakhamkin |
| 5,133,190 A | 7/1992 | Abdelmalek | | 5,934,076 A | 8/1999 | Coney |
| 5,138,838 A | 8/1992 | Crosser | | 5,937,652 A | 8/1999 | Abdelmalek |
| 5,140,170 A | 8/1992 | Henderson | | 5,971,027 A | 10/1999 | Beachley et al. |
| 5,152,260 A | 10/1992 | Erickson et al. | | 6,012,279 A | 1/2000 | Hines |
| 5,161,449 A | 11/1992 | Everett, Jr. | | 6,023,105 A | 2/2000 | Youssef |
| 5,169,295 A | 12/1992 | Stogner et al. | | 6,026,349 A | 2/2000 | Heneman |
| 5,182,086 A | 1/1993 | Henderson et al. | | 6,029,445 A | 2/2000 | Lech |
| 5,203,168 A | 4/1993 | Oshina | | 6,073,445 A | 6/2000 | Johnson |
| 5,209,063 A | 5/1993 | Shirai et al. | | 6,073,448 A | 6/2000 | Lozada |
| 5,213,470 A | 5/1993 | Lundquist | | 6,085,520 A | 7/2000 | Kohno |
| 5,239,833 A | 8/1993 | Fineblum | | 6,090,186 A | 7/2000 | Spencer |
| 5,259,345 A | 11/1993 | Richeson | | 6,119,802 A | 9/2000 | Puett, Jr. |
| 5,271,225 A | 12/1993 | Adamides | | 6,132,181 A | 10/2000 | Mccabe |
| 5,279,206 A | 1/1994 | Krantz | | 6,145,311 A | 11/2000 | Cyphelly |
| 5,296,799 A | 3/1994 | Davis | | 6,148,602 A | 11/2000 | Demetri |
| 5,309,713 A | 5/1994 | Vassallo | | 6,153,943 A | 11/2000 | Mistr, Jr. |
| 5,321,946 A | 6/1994 | Abdelmalek | | 6,158,499 A | 12/2000 | Rhodes |
| 5,327,987 A | 7/1994 | Abdelmalek | | 6,170,443 B1 | 1/2001 | Hofbauer |
| 5,339,633 A | 8/1994 | Fujii et al. | | 6,178,735 B1 | 1/2001 | Frutschi |
| 5,341,644 A | 8/1994 | Nelson | | 6,179,446 B1 | 1/2001 | Sarmadi |
| 5,344,627 A | 9/1994 | Fujii et al. | | 6,188,182 B1 | 2/2001 | Nickols et al. |
| 5,364,611 A | 11/1994 | Iijima et al. | | 6,202,707 B1 | 3/2001 | Woodall et al. |
| 5,365,980 A | 11/1994 | Deberardinis | | 6,206,660 B1 * | 3/2001 | Coney et al. .................. 417/438 |
| 5,375,417 A | 12/1994 | Barth | | 6,210,131 B1 | 4/2001 | Whitehead |
| 5,379,589 A | 1/1995 | Cohn et al. | | 6,216,462 B1 | 4/2001 | Gray, Jr. |
| 5,384,489 A | 1/1995 | Bellac | | 6,225,706 B1 | 5/2001 | Keller |
| 5,387,089 A | 2/1995 | Stogner et al. | | 6,276,123 B1 | 8/2001 | Chen et al. |
| 5,394,693 A | 3/1995 | Plyter | | 6,327,858 B1 | 12/2001 | Negre et al. |
| 5,427,194 A | 6/1995 | Miller | | 6,327,994 B1 | 12/2001 | Labrador |
| 5,436,508 A | 7/1995 | Sorensen | | 6,349,543 B1 | 2/2002 | Lisniansky |
| 5,439,829 A | 8/1995 | Anderson et al. | | RE37,603 E | 3/2002 | Coney |
| 5,448,889 A | 9/1995 | Bronicki | | 6,352,576 B1 | 3/2002 | Spencer et al. |
| 5,454,408 A | 10/1995 | DiBella et al. | | 6,360,535 B1 | 3/2002 | Fisher |
| 5,454,426 A | 10/1995 | Moseley | | 6,367,570 B1 | 4/2002 | Long, III |
| 5,467,722 A | 11/1995 | Meratla | | 6,372,023 B1 | 4/2002 | Kiyono et al. |
| 5,473,899 A | 12/1995 | Viteri | | 6,389,814 B2 | 5/2002 | Viteri et al. |
| 5,477,677 A | 12/1995 | Krnavek | | 6,397,578 B2 | 6/2002 | Tsukamoto |
| 5,491,969 A | 2/1996 | Cohn et al. | | 6,401,458 B2 | 6/2002 | Jacobson |
| 5,491,977 A | 2/1996 | Cho | | 6,407,465 B1 | 6/2002 | Peltz et al. |
| 5,522,212 A * | 6/1996 | Kubik ............................ 60/414 | | 6,419,462 B1 | 7/2002 | Horie et al. |
| 5,524,821 A | 6/1996 | Yie et al. | | 6,422,016 B2 | 7/2002 | Alkhamis |

| | | |
|---|---|---|
| 6,453,659 B1 | 9/2002 | Van Liere et al. |
| 6,478,289 B1 | 11/2002 | Trewin |
| 6,484,498 B1 | 11/2002 | Bonar, II |
| 6,512,966 B2 | 1/2003 | Lof |
| 6,513,326 B1 | 2/2003 | Maceda et al. |
| 6,516,615 B1 | 2/2003 | Stockhausen et al. |
| 6,516,616 B2 | 2/2003 | Carver et al. |
| 6,554,088 B2 | 4/2003 | Severinsky et al. |
| 6,598,392 B2 | 7/2003 | Majeres |
| 6,598,402 B2 | 7/2003 | Kataoka et al. |
| 6,606,860 B2 | 8/2003 | McFarland |
| 6,612,348 B1 | 9/2003 | Wiley |
| 6,619,930 B2 | 9/2003 | Jansen et al. |
| 6,626,212 B2 | 9/2003 | Morioka et al. |
| 6,629,413 B1 | 10/2003 | Wendt et al. |
| 6,637,185 B2 | 10/2003 | Hatamiya et al. |
| 6,652,241 B1 | 11/2003 | Alder |
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Keller-sornig |
| 6,857,450 B2 | 2/2005 | Rupp |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enis et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,887 B2 | 10/2006 | Nakamura et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Siegel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Link, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,482 B2 | 5/2009 | Ursan et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,694,514 B2 | 4/2010 | Smith et al. |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | Bollinger et al. |
| 8,037,678 B2 | 10/2011 | McBride et al. |
| 8,046,990 B2 | 11/2011 | Bollinger et al. |
| 8,104,274 B2 | 1/2012 | McBride et al. |
| 8,109,085 B2 | 2/2012 | McBride et al. |
| 8,117,842 B2 | 2/2012 | McBride et al. |
| 8,122,718 B2 | 2/2012 | McBride et al. |

| | | |
|---|---|---|
| 8,171,728 B2 | 5/2012 | Bollinger et al. |
| 8,191,362 B2 | 6/2012 | McBride et al. |
| 8,225,606 B2 | 7/2012 | McBride et al. |
| 8,234,862 B2 | 8/2012 | McBride et al. |
| 8,234,863 B2 | 8/2012 | McBride et al. |
| 8,234,868 B2 | 8/2012 | Bollinger et al. |
| 8,240,140 B2 | 8/2012 | McBride et al. |
| 8,240,146 B1 | 8/2012 | Bollinger |
| 8,245,508 B2 | 8/2012 | Bollinger et al. |
| 8,250,863 B2 | 8/2012 | Bollinger et al. |
| 8,272,212 B2 | 9/2012 | Blieske |
| 8,359,856 B2 | 1/2013 | McBride et al. |
| 8,448,433 B2 | 5/2013 | McBride et al. |
| 8,468,815 B2 | 6/2013 | McBride et al. |
| 8,474,255 B2 | 7/2013 | McBride et al. |
| 8,479,502 B2 | 7/2013 | McBride et al. |
| 8,479,505 B2 | 7/2013 | McBride et al. |
| 8,495,872 B2 | 7/2013 | McBride et al. |
| 8,539,763 B2 | 9/2013 | McBride et al. |
| 8,578,708 B2 | 11/2013 | Bollinger et al. |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0066655 A1* | 3/2005 | Aarestad et al. ............... 60/413 |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioglu |
| 2006/0218924 A1 | 10/2006 | Mitani |
| 2006/0242954 A1* | 11/2006 | Welch ............................ 60/398 |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0148731 A1 | 6/2008 | Cao |
| 2008/0155975 A1* | 7/2008 | Brinkman ........................ 60/414 |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0265581 A1* | 10/2008 | Welch et al. .................... 290/53 |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall et al. |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1* | 6/2010 | Rufer et al. ..................... 307/22 |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0257862 A1 | 10/2010 | Howes et al. |
| 2010/0270801 A1 | 10/2010 | Liu |
| 2010/0307156 A1 | 12/2010 | Bollinger |
| 2010/0326062 A1 | 12/2010 | Fong et al. |
| 2010/0326064 A1 | 12/2010 | Fong et al. |

| | | |
|---|---|---|
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0106321 A1 | 5/2011 | Cherian et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | Bollinger et al. |
| 2011/0296821 A1 | 12/2011 | Bollinger et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2011/0314810 A1 | 12/2011 | McBride et al. |
| 2012/0000557 A1 | 1/2012 | McBride et al. |
| 2012/0006013 A1 | 1/2012 | McBride et al. |
| 2012/0017580 A1 | 1/2012 | Fong et al. |
| 2012/0019009 A1 | 1/2012 | Fong et al. |
| 2012/0023919 A1 | 2/2012 | Fong et al. |
| 2012/0042772 A1 | 2/2012 | Fong et al. |
| 2012/0047884 A1 | 3/2012 | McBride et al. |
| 2012/0055146 A1 | 3/2012 | Baraga et al. |
| 2012/0057996 A1 | 3/2012 | Fong et al. |
| 2012/0057998 A1 | 3/2012 | Ingersoll et al. |
| 2012/0067036 A1 | 3/2012 | Fong et al. |
| 2012/0073432 A1 | 3/2012 | Ingersoll et al. |
| 2012/0085086 A1 | 4/2012 | Bollinger et al. |
| 2012/0090314 A1 | 4/2012 | Fong et al. |
| 2012/0096845 A1 | 4/2012 | Ingersoll et al. |
| 2012/0102935 A1 | 5/2012 | Ingersoll et al. |
| 2012/0102954 A1 | 5/2012 | Ingersoll et al. |
| 2012/0118137 A1 | 5/2012 | Fong et al. |
| 2012/0119513 A1 | 5/2012 | McBride et al. |
| 2012/0119514 A1 | 5/2012 | Crane et al. |
| 2012/0137668 A1 | 6/2012 | McBride et al. |
| 2012/0174569 A1 | 7/2012 | Ingersoll et al. |
| 2012/0197683 A1 | 8/2012 | Marcus |
| 2012/0210705 A1 | 8/2012 | McBride et al. |
| 2012/0222424 A1 | 9/2012 | Ingersoll et al. |
| 2012/0255292 A1 | 10/2012 | Fong et al. |
| 2012/0260645 A1 | 10/2012 | Fong et al. |
| 2012/0269651 A1 | 10/2012 | Fong et al. |
| 2012/0279209 A1 | 11/2012 | McBride et al. |
| 2012/0285154 A1 | 11/2012 | Bollinger et al. |
| 2012/0286522 A1 | 11/2012 | Stahlkopf et al. |
| 2012/0291989 A1 | 11/2012 | Fong et al. |
| 2012/0297772 A1 | 11/2012 | McBride et al. |
| 2012/0297776 A1 | 11/2012 | Bollinger et al. |
| 2012/0299310 A1 | 11/2012 | McBride et al. |
| 2013/0001958 A1 | 1/2013 | Crane et al. |
| 2013/0009408 A1 | 1/2013 | Crane et al. |
| 2013/0032743 A1 | 2/2013 | Fong et al. |
| 2013/0047597 A1 | 2/2013 | Fong et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0091834 A1 | 4/2013 | McBride et al. |
| 2013/0091835 A1 | 4/2013 | McBride et al. |
| 2013/0091836 A1 | 4/2013 | McBride et al. |
| 2013/0098027 A1 | 4/2013 | Le Roux et al. |
| 2013/0104533 A1 | 5/2013 | Fong et al. |
| 2013/0108480 A1 | 5/2013 | Fong et al. |
| 2013/0111895 A1 | 5/2013 | Fong et al. |
| 2013/0126014 A1 | 5/2013 | Fong et al. |
| 2013/0139500 A1 | 6/2013 | McBride et al. |
| 2013/0145764 A1 | 6/2013 | McBride et al. |
| 2013/0152568 A1 | 6/2013 | Modderno et al. |
| 2013/0152571 A1 | 6/2013 | Modderno et al. |
| 2013/0152572 A1 | 6/2013 | Madderno et al. |
| 2013/0160437 A1 | 6/2013 | McBride et al. |
| 2013/0168961 A1 | 7/2013 | Stahlkopf et al. |
| 2013/0186597 A1 | 7/2013 | Clark et al. |
| 2013/0192216 A1 | 8/2013 | Berlin et al. |
| 2013/0269330 A1 | 10/2013 | McBride et al. |
| 2013/0269331 A1 | 10/2013 | Fong |
| 2013/0276440 A1 | 10/2013 | Fong et al. |
| 2013/0291529 A1 | 11/2013 | Stahlkopf et al. |
| 2013/0291960 A1 | 11/2013 | Fong et al. |
| 2013/0294943 A1 | 11/2013 | Fong et al. |

FOREIGN PATENT DOCUMENTS

| | | |
|---|---|---|
| BE | 898225 | 3/1984 |
| BE | 1008885 | 8/1996 |
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 4/1976 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047 622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |

| | | | | | | |
|---|---|---|---|---|---|---|
| EP | 0 857 877 | 8/1998 | | WO | WO-00/37800 | 6/2000 |
| EP | 1 388 442 | 2/2004 | | WO | WO-00/65212 | 11/2000 |
| EP | 1405662 | 4/2004 | | WO | WO-00/68578 | 11/2000 |
| EP | 1657452 | 11/2004 | | WO | WO 0175290 | 10/2001 |
| EP | 1726350 | 11/2006 | | WO | WO-0175308 | 10/2001 |
| EP | 1741899 | 1/2007 | | WO | WO-02/25083 | 3/2002 |
| EP | 1 780 058 | 5/2007 | | WO | WO-02/46621 | 6/2002 |
| EP | 1988294 | 11/2008 | | WO | WO-02/103200 | 12/2002 |
| EP | 2014896 | 1/2009 | | WO | WO-03/021702 | 3/2003 |
| EP | 2078857 | 7/2009 | | WO | WO-03021107 | 3/2003 |
| FR | 2449805 | 9/1980 | | WO | WO-03/078812 | 9/2003 |
| FR | 2816993 | 5/2002 | | WO | WO-03/081011 | 10/2003 |
| FR | 2829805 | 3/2003 | | WO | WO-2004/034391 | 5/2004 |
| GB | 722524 | 11/1951 | | WO | WO-2004/059155 | 7/2004 |
| GB | 772703 | 4/1957 | | WO | WO-2004/072452 | 8/2004 |
| GB | 1449076 | 9/1976 | | WO | WO-2004/074679 | 9/2004 |
| GB | 1479940 | 7/1977 | | WO | WO-2004/109172 | 12/2004 |
| GB | 1589364 A * | 5/1981 | | WO | WO-2005/044424 | 5/2005 |
| GB | 2106992 | 4/1983 | | WO | WO-2005/062969 | 7/2005 |
| GB | 2223810 | 4/1990 | | WO | WO-2005/067373 | 7/2005 |
| GB | 2 300 673 | 11/1996 | | WO | WO-2005/079461 | 9/2005 |
| GB | 2373546 | 9/2002 | | WO | WO-2005/088131 | 9/2005 |
| GB | 2403356 | 12/2004 | | WO | WO-2005/095155 | 10/2005 |
| JP | 57010778 | 1/1982 | | WO | WO-2006/029633 | 3/2006 |
| JP | 57070970 | 5/1982 | | WO | WO-2006/058085 | 6/2006 |
| JP | 57120058 | 7/1982 | | WO | WO-2006/124006 | 11/2006 |
| JP | 58183880 | 10/1982 | | WO | WO-2007/002094 | 1/2007 |
| JP | 58150079 | 9/1983 | | WO | WO-2007/003954 | 1/2007 |
| JP | 58192976 | 11/1983 | | WO | WO-2007/012143 | 2/2007 |
| JP | 60206985 | 10/1985 | | WO | WO-2007/035997 | 4/2007 |
| JP | 62101900 | 5/1987 | | WO | WO-2007/051034 | 5/2007 |
| JP | 63227973 | 9/1988 | | WO | WO-2007/066117 | 6/2007 |
| JP | 2075674 | 3/1990 | | WO | WO-2007/086792 | 8/2007 |
| JP | 2247469 | 10/1990 | | WO | WO-2007/089872 | 8/2007 |
| JP | 3009090 | 1/1991 | | WO | WO-2007/096656 | 8/2007 |
| JP | 3281984 | 12/1991 | | WO | WO-2007/111839 | 10/2007 |
| JP | 4121424 | 4/1992 | | WO | WO-2007/136765 | 11/2007 |
| JP | 6185450 | 7/1994 | | WO | WO-2007/140914 | 12/2007 |
| JP | 8145488 | 6/1996 | | WO | WO-2008/003950 | 1/2008 |
| JP | 9166079 | 6/1997 | | WO | WO-2008/014769 | 2/2008 |
| JP | 10313547 | 11/1998 | | WO | WO-2008023901 | 2/2008 |
| JP | 2000-346093 | 6/1999 | | WO | WO-2008/027259 | 3/2008 |
| JP | 11351125 | 12/1999 | | WO | WO-2008/028881 | 3/2008 |
| JP | 2000166128 | 6/2000 | | WO | WO-2008/039725 | 4/2008 |
| JP | 2000346093 | 12/2000 | | WO | WO-2008/045468 | 4/2008 |
| JP | 2002127902 | 5/2002 | | WO | WO-2008045468 | 4/2008 |
| JP | 2003083230 | 3/2003 | | WO | WO-2008/051427 | 5/2008 |
| JP | 2005023918 | 1/2005 | | WO | WO-2008/074075 | 6/2008 |
| JP | 2005036769 | 2/2005 | | WO | WO-2008/084507 | 7/2008 |
| JP | 2005068963 | 3/2005 | | WO | WO-2008/091373 | 7/2008 |
| JP | 2006220252 | 8/2006 | | WO | WO 2008102292 | 8/2008 |
| JP | 2007001872 | 1/2007 | | WO | WO-2008/106967 | 9/2008 |
| JP | 2007145251 | 6/2007 | | WO | WO-2008/108870 | 9/2008 |
| JP | 2007211730 | 8/2007 | | WO | WO-2008/109006 | 9/2008 |
| JP | 2008038658 | 2/2008 | | WO | WO-2008/110018 | 9/2008 |
| KR | 840000180 | 2/1984 | | WO | WO-2008/115479 | 9/2008 |
| KR | 2004004637 | 1/2004 | | WO | WO-2008/121378 | 10/2008 |
| RU | 2101562 | 1/1998 | | WO | WO-2008139267 | 11/2008 |
| RU | 2169857 | 6/2001 | | WO | WO-2008/152432 | 12/2008 |
| RU | 2213255 | 9/2003 | | WO | WO-2008/153591 | 12/2008 |
| SU | 800438 | 1/1981 | | WO | WO-2008/157327 | 12/2008 |
| UA | 69030 | 8/2004 | | WO | WO-2009/034421 | 3/2009 |
| WO | WO-82/00319 | 2/1982 | | WO | WO-2009/034548 | 3/2009 |
| WO | WO-8802818 | 4/1988 | | WO | WO-2009/038973 | 3/2009 |
| WO | WO-99/41498 | 8/1990 | | WO | WO-2009/044139 | 4/2009 |
| WO | WO-92/22741 | 12/1992 | | WO | WO-2009/045110 | 4/2009 |
| WO | WO-93/06367 | 4/1993 | | WO | WO-2009/114205 | 9/2009 |
| WO | WO-93/11363 | 6/1993 | | WO | WO-2009/126784 | 10/2009 |
| WO | WO-93/24754 | 12/1993 | | WO | WO-2010/006319 | 1/2010 |
| WO | WO 9412785 | 6/1994 | | WO | WO-2010/009053 | 1/2010 |
| WO | WO-95/25381 | 9/1995 | | WO | WO-2010/040890 | 4/2010 |
| WO | WO-96/01942 | 1/1996 | | WO | WO-2010/105155 | 9/2010 |
| WO | WO-96/22456 | 7/1996 | | WO | WO-2010/135658 | 11/2010 |
| WO | WO-96/34213 | 10/1996 | | WO | WO-2011/008321 | 1/2011 |
| WO | WO-97/01029 | 1/1997 | | WO | WO-2011/008325 | 1/2011 |
| WO | WO-97/17546 | 5/1997 | | WO | WO-2011/008500 | 1/2011 |
| WO | WO-98/02818 | 1/1998 | | WO | WO-2011/079267 | 6/2011 |
| WO | WO-98/17492 | 4/1998 | | WO | WO-2011/079271 | 6/2011 |
| WO | WO-00/01945 | 1/2000 | | | | |

OTHER PUBLICATIONS

"Hydraulic Transformer Supplies Continuous High Pressure," Machine Design, Penton Media, vol. 64, No. 17, (Aug. 1992), 1 page.
Lemofouet, "Investigation and Optimisation of Hybrid Electricity Storage Systems Based on Compressed Air and Supercapacitors," (Oct. 20, 2006), 250 pages.
Cyphelly et al., "Usage of Compressed Air Storage Systems," BFE-Program "Electricity," Final Report, May 2004, 14 pages.
Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.
International Search Report and Written Opinion issued Sep. 15, 2009 for International Application No. PCT/US2009/040027, 8 pages.
International Search Report and Written Opinion issued Aug. 30, 2010 for International Application No. PCT/US2010/029795, 9 pages.
International Search Report and Written Opinion issued Dec. 3, 2009 for International Application No. PCT/US2009/046725, 9 pages.
International Search Report and Written Opinion issued Jan. 4, 2011 for International Application No. PCT/US2010/055279, 13 pages.
International Search Report and Written Opinion mailed May 25, 2011 for International Application No. PCT/US2010/027138, 12 pages.
Rufer et al., "Energetic Performance of a Hybrid Energy Storage System Based on Compressed Air and Super Capacitors," Power Electronics, Electrical Drives, Automation and Motion, (May 1, 2006), pp. 469-474.
Lemofouet et al. "Hybrid Energy Storage Systems based on Compressed Air and Supercapacitors with Maximum Efficiency Point Tracking," Industrial Electronics Laboratory (LEI), (2005), pp. 1-10.
Lemofouet et al. "Hybrid Energy Storage Systems based on Compressed Air and Supercapacitors with Maximum Efficiency Point Tracking," The International Power Electronics Conference, (2005), pp. 461-468.
International Preliminary Report on Patentability mailed Oct. 13, 2011 for International Application No. PCT/US2010/029795 (9 pages).
Stephenson et al., "Computer Modelling of Isothermal Compression in the Reciprocating Compressor of a Complete Isoengine," 9th International Conference on Liquid Atomization and Spray Systems (Jul. 13-17, 2003).
Coney et al., "Development of a Reciprocating Compressor Using Water Injection to Achieve Quasi-Isothermal Compression," Purdue University International Compressor Engineering Conference (2002).
Linnemann et al., "The Isoengine—A Novel High Efficiency Engine with Optional Compressed Air Energy Storage (CAES)," International Joint Power Generation Conference (Jun. 16-19, 2003).
Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).
Winterburn et al., "Mechanisms of Ultrasound Foam Interactions," Asia-Pac. J. Chem. Eng., vol. 4, pp. 184-190 (2009).

\* cited by examiner

*Primary Examiner* — Thomas Denion
*Assistant Examiner* — Mickey France
(74) *Attorney, Agent, or Firm* — Bingham McCutchen, LLP

(57) ABSTRACT

In various embodiments, heat is exchanged with a gas being compressed or expanded within an energy storage and recovery system without the use of flexible hoses.

15 Claims, 7 Drawing Sheets

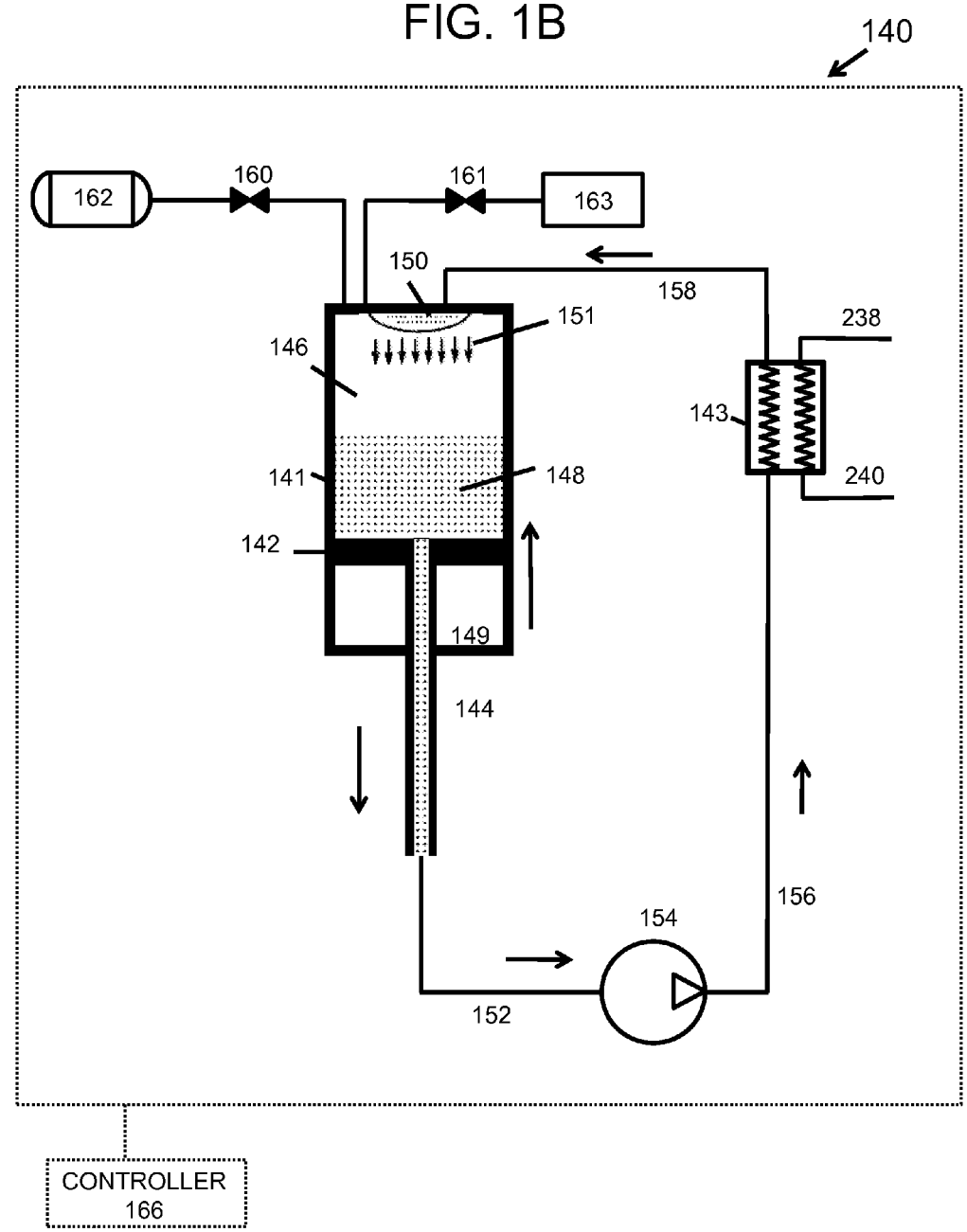

FLUID CIRCULATION IN ENERGY STORAGE AND RECOVERY SYSTEMS

RELATED APPLICATIONS

This application claims the benefit of and priority to U.S. Provisional Patent Application No. 61/384,814, filed Sep. 21, 2010, and U.S. Provisional Patent Application No. 61/494,473, filed Jun. 8, 2011. This application is also a continuation-in-part of U.S. patent application Ser. No. 12/966,773, filed Dec. 13, 2010, which is a continuation of U.S. patent application Ser. No. 12/690,513, filed Jan. 20, 2010, which claims priority to U.S. Provisional Patent Application No. 61/145,860, filed on Jan. 20, 2009, U.S. Provisional Patent Application No. 61/145,864, filed on Jan. 20, 2009, U.S. Provisional Patent Application No. 61/146,432, filed on Jan. 22, 2009, U.S. Provisional Patent Application No. 61/148,481, filed on Jan. 30, 2009, U.S. Provisional Patent Application No. 61/151,332, filed on Feb. 10, 2009, U.S. Provisional Patent Application No. 61/227,222, filed on Jul. 21, 2009, U.S. Provisional Patent Application No. 61/256,576, filed on Oct. 30, 2009, U.S. Provisional Patent Application No. 61/264,317, filed on Nov. 25, 2009, and U.S. Provisional Patent Application No. 61/266,758, filed on Dec. 4, 2009. This application is also a continuation-in-part of U.S. patent application Ser. No. 12/639,703, filed Dec. 16, 2009, which (i) is a continuation-in-part of U.S. patent application Ser. No. 12/421,057, filed Apr. 9, 2009, which claims the benefit of and priority to U.S. Provisional Patent Application No. 61/148,691, filed Jan. 30, 2009, and U.S. Provisional Patent Application No. 61/043,630, filed Apr. 9, 2008; (ii) is a continuation-in-part of U.S. patent application Ser. No. 12/481,235, filed Jun. 9, 2009, which claims the benefit of and priority to U.S. Provisional Patent Application No. 61/059,964, filed Jun. 9, 2008; and (iii) claims the benefit of and priority to U.S. Provisional Patent Application Nos. 61/166,448, filed on Apr. 3, 2009; 61/184,166, filed on Jun. 4, 2009; 61/223,564, filed on Jul. 7, 2009; 61/227,222, filed on Jul. 21, 2009; and 61/251,965, filed on Oct. 15, 2009. The entire disclosure of each of these applications is hereby incorporated herein by reference.

STATEMENT REGARDING FEDERALLY SPONSORED RESEARCH

This invention was made with government support under IIP-0923633 awarded by the NSF and DE-OE0000231 awarded by the DOE. The government has certain rights in the invention.

FIELD OF THE INVENTION

In various embodiments, the present invention relates to pneumatics, hydraulics, power generation, and energy storage, and more particularly, to systems and methods using pneumatic, pneumatic/hydraulic, and/or hydraulic cylinders for energy storage and recovery.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of high-pressure gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207, filed Apr. 9, 2009 (the '207 patent) and U.S. Pat. No. 7,874,155, filed Feb. 25, 2010 (the '155 patent), the disclosures of which are hereby incorporated herein by reference in their entireties. The '207 and '155 patents disclose systems and techniques for expanding gas isothermally in staged cylinders and intensifiers over a large pressure range in order to generate electrical energy when required. Mechanical energy from the expanding gas may be used to drive a hydraulic pump/motor subsystem that produces electricity. Systems and techniques for hydraulic-pneumatic pressure intensification that may be employed in systems and methods such as those disclosed in the '207 and '155 patents are shown and described in U.S. patent application Ser. No. 12/879,595, filed Sep. 10, 2010 (the '595 application), the disclosure of which is hereby incorporated herein by reference in its entirety.

In the systems disclosed in the '207 and '155 patents, reciprocal mechanical motion is produced during recovery of energy from storage by expansion of gas in the cylinders. This reciprocal motion may be converted to electricity by a variety of means, for example as disclosed in the '595 application as well as in U.S. patent application Ser. No. 12/938,853, filed Nov. 3, 2010 (the '853 application), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

During expansion of gas from storage in certain systems such as those disclosed in the '207 and '155 patents, the pressure of a quantity of gas within one chamber of a pneumatic or pneumatic-hydraulic cylinder exerts a force upon a piston and attached rod slidably disposed within the cylinder. The force exerted by the gas upon the piston and rod causes the piston and rod to move. The temperature of the gas undergoing expansion tends to decrease. To control the temperature of the quantity of gas being expanded within the cylinder (e.g., to hold it substantially constant, that is, to produce isothermal expansion), a heat-exchange liquid may be sprayed into the chamber containing the expanding gas. To prevent excess heat-exchange liquid from accumulating within the chamber, heat-exchange liquid may be removed continuously or episodically from the chamber. The liquid is conducted through a pipe to a pump that forces the liquid through a heat exchanger and back to the hydraulic cylinder, where the liquid is re-injected as a spray. The temperature of gas undergoing compression within the cylinder may be similarly controlled by circulation of the heat-exchange liquid.

In such an arrangement, portions of the cylinder assembly are in motion during either expansion or compression of gas within the cylinder. Consequently, if continuous circulation of the heat-exchange liquid is to be maintained, the pipe conveying the heat-exchange liquid generally flexes while the piston moves. A flexible pipe that flexes during operation is herein termed a hose. Flexure of a hose subjects its constituent materials, its connection points, and possibly other components (e.g., rod and/or rod gaskets) to time-varying forces. Such forces tend to shorten the lifespans of components subjected to them. Hence, there is a need for systems enabling the circulation of heat-exchange fluids into, within, and/or out of compressed-gas energy storage and recovery systems without utilization of flexible hose.

SUMMARY

Embodiments of the invention enable the circulation of heat-exchange liquid in various energy storage and recovery systems without the use of hoses that flex during operation. Systems employing various embodiments of the invention contain fewer moving parts and undergo fewer motion-related stresses than comparable systems employing hoses. Thus, embodiments of the invention increase the simplicity and reliability of a pneumatic (and/or pneumatic-hydraulic) compressor-expander cylinder through which a heat-exchange liquid is circulated. Various embodiments enable the injection of heat-exchange liquid into and the removal of heat-exchange liquid from one or both chambers in a pneumatic compressor-expander cylinder without recourse to flexible hose. An at least partially internal tube (which is preferably rigid), herein termed a straw, is used to convey liquid from one chamber of the cylinder to the exterior of the cylinder. (While in some embodiments a straw may be innately flexible, it does not flex during normal operation in accordance with embodiments of the invention.) Two or more straws may be used to convey liquid from both chambers of the cylinder to the exterior of the cylinder. In various embodiments of the invention, the straw or tube may include or be a part of an internal pump (e.g., submersible bore pump, axial flow pump, or other in-line style pump) to convey liquid from one chamber of the cylinder to the exterior of the cylinder. Thus, heat-exchange fluid may be circulated through the straw via use of an internal circulation apparatus (e.g., a pump) or via its own pumping action.

Embodiments of the invention include one or more of four approaches to the circulation of a heat-exchange liquid through a pneumatic cylinder within which gas is expanded or compressed. First, in a system employing at least one vertically-aligned pneumatic cylinder for the expansion or compression of gas, where each cylinder contains a piston slidably disposed therein and a vertically aligned rod attached to the piston, a rigid, hollow tube open at both ends, herein termed a straw, is located within each cylinder. Gas to be expanded or compressed may be introduced into the chamber above the piston, herein termed the upper chamber; the chamber below the piston may contain gas or liquid. Heat-exchange liquid may be introduced into the upper chamber through one or more spray heads located within the upper chamber. The straw is attached to the upper portion of the cylinder and its position within the cylinder is fixed. The straw is aligned with a cavity within the rod (e.g., center drilled rod, plugged hollow rod) and also passing through the piston. A portion of the straw is inserted into the cavity: the extent of this inserted portion varies with the position of the rod and piston. The straw is sufficiently smaller in diameter than the cavity so that liquid may flow in the portion of the cavity that surrounds the straw. The upper end of the straw is not in liquid communication with the interior of the cylinder; it is in liquid communication with a pipe external to the cylinder. The upper end of the cavity is open to the upper chamber; the lower end of the cavity is sealed. If heat-exchange liquid is present in or is sprayed into the upper chamber of the cylinder, it accumulates on the upper surface of the piston and flows down into the cavity. The cavity is in fluid communication with the interior of the straw, whose nether end is always within the cavity. Heat-exchange liquid passes from the portion of the cavity surrounding the straw into the nether end of the straw. The liquid then passes up the straw, through the upper end of the cylinder, and into a pipe external to the cylinder that conducts it to a pump. The liquid passes out of the pump, thence through a heat exchanger, and thence back to the cylinder assembly, where it enters the upper chamber of the cylinder as a spray. A complete circuit containing no hose is thus established for the heat-exchange liquid.

Second, in a system employing at least one pneumatic cylinder for the expansion or compression of gas, where each cylinder contains a piston slidably disposed therein and a rod attached to the piston, a straw is located within each cylinder. Gas to be expanded or compressed may be introduced into the chamber below the piston, herein termed the lower chamber; the chamber above the piston may contain gas or liquid. Heat-exchange liquid may be introduced into the lower chamber through a spray head attached to the nether surface of the piston. The straw is attached to the lower portion of the cylinder and its position within the cylinder is fixed. The straw is aligned with a cavity within the rod (e.g., center drilled rod, plugged hollow rod) and also passing through the piston. A portion of the straw is inserted into the cavity: the extent of this inserted portion varies with the position of the rod and piston. The straw is sufficiently smaller in diameter than the center-drilled cavity so that liquid may flow in the portion of the cavity that surrounds the straw. The cavity is in fluid communication with the interior of the straw, whose upper end is always within the cavity. The nether end of the straw is not in liquid communication with the interior of the cylinder; it is in liquid communication with a pipe external to the cylinder. The upper end of the center-drilled cavity is sealed. If heat-exchange liquid is sprayed into the lower chamber, it accumulates on the lower surface of the lower chamber. The heat-exchange liquid exits the lower chamber through a port and passes into a pipe external to the cylinder. This pipe conducts the heat-exchange liquid to a pump. Exiting the pump, the heat-exchange liquid passes through a heat exchanger. Exiting the heat exchanger, the heat-exchange liquid is conducted to the nether end of the straw and passes up the interior of the straw into the portion of the cavity surrounding the straw within the rod. The heat-exchange liquid then passes from the cavity into the spray head attached to the nether surface of the piston. Passing into the spray head, the heat-exchange liquid is at a pressure (e.g., approximately 3,050 psi) higher than the pressure within the lower chamber (e.g., approximately 3,000 psi). The pressure in the straw is thus somewhat higher (e.g., approximately 50 psi higher) than the pressure in the lower chamber. To prevent leakage of heat exchange fluid and equalization of the pressures in the straw and lower chamber, a seal capable of maintaining a pressure differential (e.g., approximately 50 psi) is attached to the nether surface of the spray head or piston, surrounding the straw and in contact with it. A complete circuit containing no hose is thus established for the heat-exchange liquid.

Third, in a system employing at least one pneumatic cylinder for the expansion or compression of gas, where each cylinder contains a piston slidably disposed therein and a rod attached to the nether side of the piston, two straws are located within each cylinder. Gas to be expanded or compressed may be introduced into either the chamber below the piston, herein termed the lower chamber, or into the chamber above the piston, herein termed the upper chamber. The cylinder may perform an expansion or compression in either direction of piston motion; a cylinder so equipped is herein termed a double-acting cylinder. Heat-exchange liquid may be introduced into the upper chamber through a spray head located within the upper chamber; heat-exchange liquid may be introduced into the lower chamber through a spray head attached to the nether surface of the piston. Two parallel cavities are drilled lengthwise into the rod and are sealed at the rod's nether end. The two straws within the cylinder may be designated A and B and the two cavities in the rod may be designated a and b. Straw A is disposed with respect to cavity a, the upper chamber, and an external pump and heat exchanger (as described above in the first embodiment) serves to circulate heat-exchange liquid through the upper chamber during expansion or compression of gas in the upper chamber. Straw B is disposed with respect to cavity b, the lower chamber, and an external pump and heat exchanger (as described above in the second embodiment) serves to circulate heat-exchange liquid through the lower chamber during expansion or compression of gas in the lower chamber.

Fourth, in a system employing at least one pneumatic cylinder for the expansion or compression of gas, where each cylinder contains a piston slidably disposed therein and a rod attached to the piston, an internal pump (e.g., submersible bore pump, axial flow pump, or other in-line type pump) is located within each cylinder. Gas to be expanded or compressed may be introduced into the chamber above the piston, herein termed the upper chamber; the chamber below the piston may contain gas or liquid. Heat-exchange liquid may be introduced into the upper chamber through a spray head attached to the upper surface of the chamber. Preferably, the internal pump is attached to the upper portion of the cylinder and its position within the cylinder is fixed. The internal pump is aligned with a cavity within the rod (e.g., center drilled rod, plugged hollow rod) and also passing through the piston. A portion of the internal pump is inserted into the cavity: the extent of this inserted portion varies with the position of the rod and piston. The internal pump is sufficiently smaller in diameter than the center-drilled cavity so that liquid may flow in the portion of the cavity that surrounds the internal pump shaft. The cavity is in fluid communication with the interior of the pump, whose lower end is always within the cavity. The upper portion of the internal pump is not in liquid communication with the interior of the cylinder; it is in liquid communication with a pipe external to the cylinder. If heat-exchange liquid is sprayed into the upper chamber, it accumulates on the upper surface of the piston. The heat-exchange liquid exits the upper chamber through the rod cavity and passes through the internal pump into a pipe external to the cylinder. This pipe conducts the heat-exchange liquid to a heat exchanger. Exiting the heat exchanger, the heat-exchange liquid then passes into the spray head attached to the upper surface of the chamber. Passing into the spray head, the heat-exchange liquid is at a pressure (e.g., approximately 3,050 psi) higher than the pressure within the upper chamber (e.g., approximately 3,000 psi). A complete circuit containing no hose is thus established for the heat-exchange liquid.

Embodiments of the present invention are typically utilized in energy storage and generation systems utilizing compressed gas. In a compressed-gas energy storage system, gas is stored at high pressure (e.g., approximately 3,000 psi). This gas may be expanded into a cylinder having a first compartment (or "chamber") and a second compartment separated by a piston slidably disposed within the cylinder (or by another boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '595 and '853 applications. Moreover, a motor/generator may be coupled to the transmission mechanism. Alternatively or additionally, the shaft of the cylinders may be coupled to one or more linear generators, as described in the '853 application.

As also described in the '853 application, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be similarly connected to a fourth cylinder; and so on.

The principle may be extended to more than two cylinders to suit particular applications. For example, a narrower output force range for a given range of reservoir pressures is achieved by having a first, high-pressure cylinder operating between, for example, approximately 3,000 psig and approximately 300 psig and a second, larger-volume, lower-pressure cylinder operating between, for example, approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '853 application). Furthermore, as set forth in the '595 application, N appropriately sized cylinders can reduce an original operating pressure range R to $R^{1/N}$. Any group of N cylinders staged in this manner, where $N \geq 2$, is herein termed a cylinder group.

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

The systems described herein, and/or other embodiments employing liquid-spray heat exchange or external gas heat exchange, may draw or deliver thermal energy via their heat-exchange mechanisms to external systems (not shown) for purposes of cogeneration, as described in U.S. Pat. No. 7,958,731, filed Jan. 20, 2010 (the '731 patent), the entire disclosure of which is incorporated by reference herein.

The compressed-air energy storage and recovery systems described herein are preferably "open-air" systems, i.e., systems that take in air from the ambient atmosphere for compression and vent air back to the ambient after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. The systems also include (i) a reservoir for storage of compressed gas after compression and supply of compressed gas for expansion thereof, and (ii) a vent for exhausting expanded gas to atmosphere after expansion and supply of gas for compression. The storage reservoir may include or consist essentially of, e.g., one or more one or more pressure vessels (i.e., containers for compressed gas that may have rigid exteriors or may be inflatable, and that may be formed of various suitable materials such as metal or plastic) or caverns (i.e., naturally occurring or artificially created cavities that are typically located underground). Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a compressed gas energy storage and recovery system including or consisting essentially of a cylinder assembly, a mechanism for introducing heat-exchange fluid, and a tube for facilitating recirculation of heat-exchange fluid. The cylinder assembly typically includes or consists essentially of first and second compartments, a piston, slidably disposed within the cylinder assembly, separating the compartments, and a piston rod coupled to the piston and extending outside the first compartment. The piston rod includes a cavity in fluid communication with the second compartment. The mechanism introduces heat-exchange fluid within the second compartment. The tube is configured for non-flexure and disposed at least partially within the cavity and in fluid communication with the mechanism, and facilitates recirculation of heat-exchange fluid from the second compartment to the mechanism.

Embodiments of the invention may include one or more of the following, in any of a variety of combinations. The tube may be substantially rigid and/or coaxially disposed within the cavity. The tube may extend outside the second compartment and/or may include or consist essentially of an internal pump. The internal pump may include or consist essentially of a submersible bore pump, an axial flow pump, and/or an in-line-type pump. A motor may operate the internal pump, and the motor may be disposed within the cavity. The tube may include or consist essentially of a substantially hollow cylinder.

The mechanism may include or consist essentially of a spray head, which may be annular and/or at least partially disposed around the tube. The system may include a heat exchanger and an external circulation apparatus for circulating heat-exchange fluid from the second compartment through the heat exchanger and back to the second compartment. The heat-exchange fluid may be circulated from the second compartment to, in order, (i) the tube, (ii) the heat exchanger, and (iii) the mechanism or to, in order, (i) the heat exchanger, (ii) the tube, and (iii) the mechanism. The system may include a heat exchanger, and the tube may include or consist essentially of an internal pump for circulating heat-exchanger fluid from the second compartment through the heat exchanger and back to the second compartment.

The system may include a second mechanism for introducing heat-exchange fluid within the first compartment and a second tube disposed at least partially within a second cavity (which may be different from the cavity mentioned above) in the piston rod and in fluid communication with the second mechanism. The second tube may be configured for non-flexure. The second tube may be substantially rigid and/or include or consist essentially of an internal pump. The internal pump may include or consist essentially of a submersible bore pump, an axial flow pump, and/or an in-line-type pump. The second tube may include or consist of a substantially hollow cylinder. The second mechanism may include or consist essentially of a spray head. The system may include a second heat exchanger (which may be different from the heat exchanger mentioned above) and a second external circulation apparatus (which may be different from the external circulation apparatus mentioned above) for circulating heat-exchange fluid from the first compartment through the second heat exchanger and back to the first compartment. A seal for preventing the flow of heat-exchange fluid from the cavity directly into the second compartment may be disposed between the mechanism and the tube. The tube may be configured to remain stationary notwithstanding movement of the piston and piston rod during expansion or compression of a gas in the second compartment. The heat-exchange fluid may include or consist essentially of water.

In another aspect, embodiments of the invention feature a method for energy storage and recovery. A gas is expanded and/or compressed within a chamber of a cylinder assembly that includes a piston rod slidably disposed therewithin and a piston rod coupled to the piston. Heat-exchange fluid is circulated from the chamber, through the piston rod in a plurality of different directions, and back to the chamber. The plurality of different directions may include or consist essentially of two parallel opposite directions. The heat-exchange fluid may be thermally conditioned before it circulates back to the chamber.

In yet another aspect, embodiments of the invention feature a method for energy storage and recovery. A gas is expanded and/or compressed within a chamber of a cylinder assembly. Heat is exchanged with the gas during the expansion and/or compression via continuous recirculation (i.e., continuously during the expansion and/or compression) of a heat-exchange fluid through the chamber and an external heat exchanger via piping and without flexure of the piping. The heat exchange may render the expansion and/or compression substantially isothermal.

In another aspect, embodiments of the invention feature a method for energy storage and recovery. A gas is expanded and/or compressed within a chamber of a cylinder assembly. Heat is exchanged with the gas during the expansion and/or compression via continuous recirculation (i.e., continuously during the expansion and/or compression) of a heat-exchange fluid through the chamber and an external heat exchanger via an internal pump disposed at least partially within the chamber. The heat exchange may render the expansion and/or compression substantially isothermal. The internal pump may be disposed at least partially within a cavity within a piston rod, the piston road being mechanically coupled to a piston disposed within the cylinder assembly and partially defining the chamber, and the cavity may be in fluid communication with the chamber.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications. As used herein, "thermal conditioning" of a heat-exchange fluid does not include any modification of the temperature of the heat-exchange fluid resulting from interaction with gas with which the heat-exchange fluid is exchanging thermal energy; rather, such thermal conditioning generally refers to the modification of the temperature of the heat-exchange fluid by other means (e.g., an external heat exchanger). Unless otherwise indicated, motor/pumps described herein are not required to be configured to function both as a motor and a pump if they are utilized during system operation only as a motor or a pump but not both.

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which:

FIG. 1B is a schematic drawing of various components of a compressed-gas energy storage system in accordance with various embodiments of the invention;

DETAILED DESCRIPTION

Figure 1A:
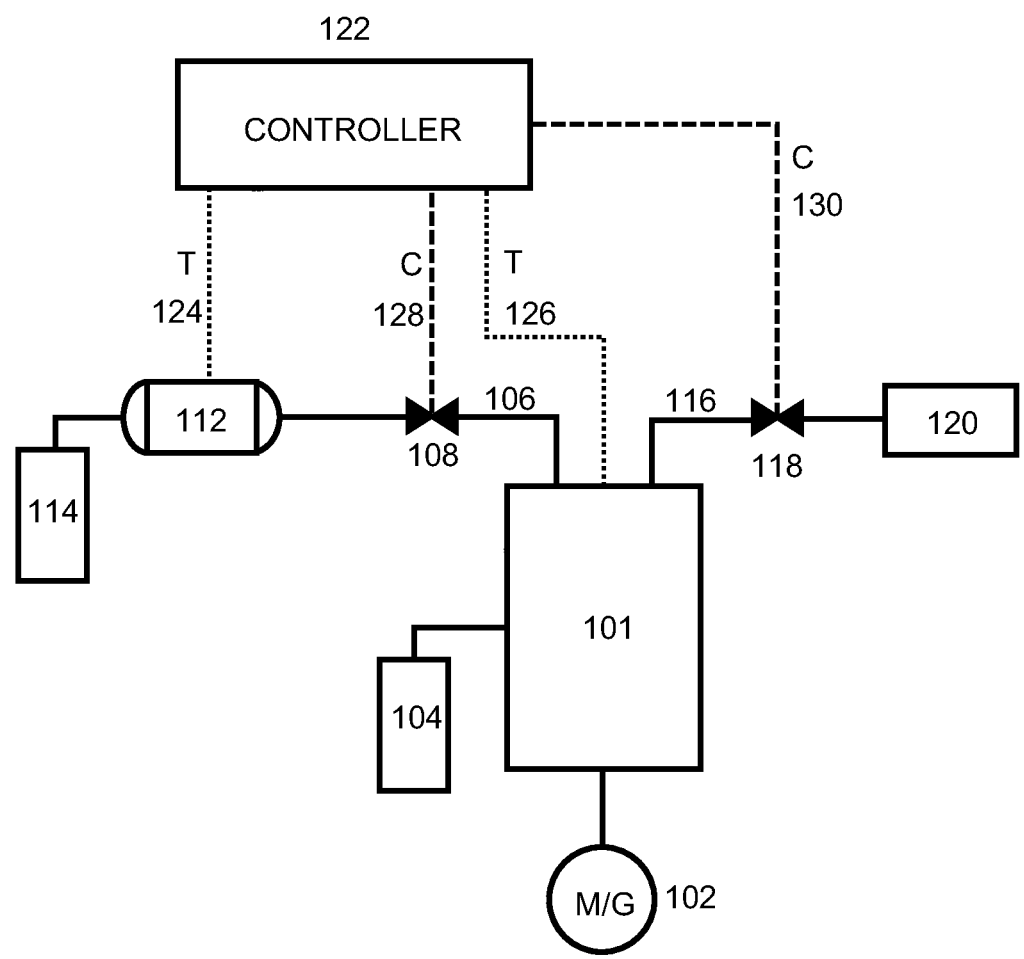
FIG. 1A is a schematic drawing of a compressed-gas energy storage system in accordance with various embodiments of the invention.

FIG. 1A depicts an illustrative system 100 that may be part of a larger system, not otherwise depicted, for the storage and release of energy. Subsequent figures will clarify the application of embodiments of the invention to such a system. The system 100 depicted in FIG. 1A features an assembly 101 for compressing and expanding gas. Expansion/compression assembly 101 may include or consist essentially of either one or more individual devices for expanding or compressing gas (e.g., turbines or cylinder assemblies that each may house a moveable boundary mechanism) or a staged series of such devices, as well as ancillary devices (e.g., valves) not depicted explicitly in FIG. 1A.

An electric motor/generator 102 (e.g., a rotary or linear electric machine) is in physical communication (e.g., via hydraulic pump, piston shaft, or mechanical crankshaft) with the expansion/compression assembly 101. The motor/generator 102 may be electrically connected to a source and/or sink of electric energy not explicitly depicted in FIG. 1A (e.g., an electrical distribution grid or a source of renewable energy such as one or more wind turbines or solar cells).

The expansion/compression assembly 101 may be in fluid communication with a heat-transfer subsystem 104 that alters the temperature and/or pressure of a fluid (i.e., gas, liquid, or gas-liquid mixture) extracted from expansion/compression assembly 101 and, after alteration of the fluid's temperature and/or pressure, returns at least a portion of it to expansion/compression assembly 101. Heat-transfer subsystem 104 may include pumps, valves, and other devices (not depicted explicitly in FIG. 1A) ancillary to its heat-transfer function and to the transfer of fluid to and from expansion/compression assembly 101. Operated appropriately, the heat-transfer subsystem 104 enables substantially isothermal compression and/or expansion of gas inside expansion/compression assembly 101.

Connected to the expansion/compression assembly 101 is a pipe 106 with a control valve 108 that controls a flow of fluid (e.g., gas) between assembly 101 and a storage reservoir 112 (e.g., one or more pressure vessels and/or caverns). The storage reservoir 112 may be in fluid communication with a heat-transfer subsystem 114 that alters the temperature and/or pressure of fluid removed from storage reservoir 112 and, after alteration of the fluid's temperature and/or pressure, returns it to storage reservoir 112. A second pipe 116 with a control valve 118 may be in fluid communication with the expansion/compression assembly 101 and with a vent 120 that communicates with a body of gas at relatively low pressure (e.g., the ambient atmosphere).

A control system 122 receives information inputs from any of expansion/compression assembly 101, storage reservoir 112, and other components of system 100 and sources external to system 100. These information inputs may include or consist essentially of pressure, temperature, and/or other telemetered measurements of properties of components of system 101. Such information inputs, here generically denoted by the letter "T," are transmitted to control system 122 either wirelessly or through wires. Such transmission is denoted in FIG. 1A by dotted lines 124, 126.

The control system 122 may selectively control valves 108 and 118 to enable substantially isothermal compression and/or expansion of a gas in assembly 101. Control signals, here generically denoted by the letter "C," are transmitted to valves 108 and 118 either wirelessly or through wires. Such transmission is denoted in FIG. 1A by dashed lines 128, 130. The control system 122 may also control the operation of the heat-transfer assemblies 104, 114 and of other components not explicitly depicted in FIG. 1A. The transmission of control and telemetry signals for these purposes is not explicitly depicted in FIG. 1A.

The control system 122 may be any acceptable control device with a human-machine interface. For example, the control system 122 may include a computer (for example a PC-type) that executes a stored control application in the form of a computer-readable software medium. More generally, control system 122 may be realized as software, hardware, or some combination thereof. For example, control system 122 may be implemented on one or more computers, such as a PC having a CPU board containing one or more processors such as the Pentium, Core, Atom, or Celeron family of processors manufactured by Intel Corporation of Santa Clara, Calif., the 680×0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 122 are provided by software, the program may be written in any one of a number of high-level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

As described above, the control system 122 may receive telemetry from sensors monitoring various aspects of the operation of system 100, and may provide signals to control valve actuators, valves, motors, and other electromechanical/electronic devices. Control system 122 may communicate with such sensors and/or other components of system 100 (and other embodiments described herein) via wired or wireless communication. An appropriate interface may be used to convert data from sensors into a form readable by the control system 122 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

System 100 may be operated so as to compress gas admitted through the vent 120 and store the gas thus compressed in reservoir 112. For example, in an initial state of operation, valve 108 is closed and valve 118 is open, admitting a quantity of gas into expansion/compression assembly 101. When a desired quantity of gas has been admitted into assembly 101, valve 118 may be closed. The motor/generator 102, employing energy supplied by a source not explicitly depicted in FIG. 1A (e.g., the electrical grid), then provides mechanical power to expansion/compression assembly 101, enabling the gas within assembly 101 to be compressed.

During compression of the gas within assembly 101, fluid (i.e., gas, liquid, or a gas-liquid mixture) may be circulated between assembly 101 and heat-exchange assembly 104. Heat-exchange assembly 104 may be operated in such a manner as to enable substantially isothermal compression of the gas within assembly 101. During or after compression of the gas within assembly 101, valve 108 may be opened to enable high-pressure fluid (e.g., compressed gas or a mixture of liquid and compressed gas) to flow to reservoir 112. Heat-exchange assembly 114 may be operated at any time in such a manner as to alter the temperature and/or pressure of the fluid within reservoir 112.

That system 100 may also be operated so as to expand compressed gas from reservoir 112 in expansion/compression assembly 101 in such a manner as to deliver energy to the motor/generator 102 will be apparent to all persons familiar with the operation of pneumatic, hydraulic, and electric machines.

FIG. 1B depicts an illustrative system 140 that features a cylinder assembly 141 (i.e., an embodiment of assembly 101 in FIG. 1A) in communication with a reservoir 162 (112 in FIG. 1A) and a vent to atmosphere 163 (120 in FIG. 1A). In the illustrative system 140 shown in FIG. 2, the cylinder assembly 141 contains a piston 142 slidably disposed therein with a center-drilled rod 144 defining a fluid passageway extending from the piston 142. In some embodiments the piston 142 is replaced by a different boundary mechanism dividing cylinder assembly 141 into multiple chambers, or piston 142 is absent entirely, and cylinder assembly 141 is a "liquid piston." The cylinder assembly 141 may be divided into, e.g., two pneumatic chambers or one pneumatic chamber and one hydraulic chamber. The rod 144 is also attached to, e.g., a mechanical load (e.g., a crankshaft or a hydraulic system) that is not depicted. The cylinder assembly 141 is in liquid communication with a heat-transfer subsystem (104 in FIG. 1A) that includes or consists essentially of a circulation pump 154, a spray mechanism 150, and a heat exchanger 143 to enable substantially isothermal compression/expansion of air. Spray mechanism 150 may include or consist essentially of one or more spray heads (e.g., disposed at one end of cylinder assembly 141) and/or spray rods (e.g., extending along at least a portion of the central axis of cylinder assembly 141). System 140 further includes a first control valve 160 (108 in FIG. 1A) in communication with a storage reservoir 162 and cylinder assembly 141, and a second control valve 161 (118 in FIG. 1A) in communication with a vent 163 and cylinder assembly 141. A control system 166 (122 in FIG. 1A) may control operation of, e.g., valves 162 and 161 based on various system inputs (e.g., pressure, temperature, piston position, and/or fluid state) from cylinder assembly 141 and/or storage reservoir 162.

In an initial state, the cylinder assembly 141 may contain a gas 146 (e.g., air introduced to the cylinder assembly 141 via valve 161 and vent 163) and a heat-transfer fluid 148 (which may include or consist essentially of, e.g., water or another suitable liquid). When the gas 146 enters the cylinder assembly 141, piston 142 is operated to compress the gas 146 to an elevated pressure (e.g., 3,000 psi). The heat-transfer fluid 148 flows through the center-drilled rod 144 and through a pipe 152 to the pump 154 (any fluid 149 on the other side of the piston 142 may flow through other valves and pipes that are not shown). The pump 154 may raise the pressure of the heat-exchange fluid 148 to a pressure (e.g., up to approximately 3,015 psig) somewhat higher than the pressure within the cylinder assembly 141, as described in U.S. patent application Ser. No. 13/009,409, filed Jan. 19, 2011 (the '409 application), the entire disclosure of which is incorporated by reference herein. The heat-transfer fluid 148 is then sent through a pipe 156 to the heat exchanger 143, where its temperature is altered, and then through a pipe 158 to the spray mechanism 150 disposed within the cylinder assembly 141. Heat-transfer spray 151 from spray mechanism 150 is admitted into cylinder assembly 141 to enable substantially isothermal compression of gas 146. In some embodiments, the heat exchanger 143 is configured to condition heat-transfer fluid 148 at low pressure (e.g., a pressure lower than the maximum pressure of a compression or expansion stroke in cylinder assembly 141), and heat-transfer fluid 148 is thermally conditioned between strokes or only during portions of strokes, as detailed in U.S. patent application Ser. No. 13/211,440, filed Aug. 17, 2011 (the '440 application), the entire disclosure of which is incorporated by reference herein.

At or near the end of the compression stroke, control system 166 opens valve 160 to admit the compressed gas 146 to the storage reservoir 162. Operation of valves 160 and 161 may be controlled by various inputs to control system 166, such as piston position in cylinder assembly 141, pressure in storage vessel 162, pressure in cylinder assembly 141, and/or temperature in cylinder assembly 141.

As mentioned above, the control system 166 may enforce substantially isothermal operation, i.e., expansion and/or compression of gas in cylinder assembly 141, via control over, e.g., the introduction of gas into and the exhausting of gas out of cylinder assembly 141, the rates of compression and/or expansion, and/or the operation of the heat-exchange subsystem in response to sensed conditions. For example, control system 166 may be responsive to one or more sensors disposed in or on cylinder assembly 141 for measuring the temperature of the gas and/or the heat-exchange fluid within cylinder assembly 141, responding to deviations in temperature by issuing control signals that operate one or more of the system components noted above to compensate, in real time, for the sensed temperature deviations. For example, in response to a temperature increase within cylinder assembly 141, control system 166 may issue commands to increase the flow rate of spray 151 of heat-exchange fluid 148.

Furthermore, embodiments of the invention may be applied to systems in which cylinder assembly 141 (or a chamber thereof) is in fluid communication with a pneumatic chamber of a second cylinder. That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 143 may be filled with water, a coolant mixture, and/or any acceptable heat-exchange medium. In alternative embodiments, a gas, such as air or refrigerant, is used as the heat-exchange medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 238 and fluid outlet 240 of the external heat exchange side of the heat exchanger 143 to an installation (not shown) such as a heat-engine power plant, an industrial process with waste heat, a heat pump, and/or a building needing space heating or cooling, as described in the '731 patent. The installation may be a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-exchange fluid to acquire or expel heat from/to the linked process, depending on configuration, for later use as a heating/cooling medium in the energy storage/conversion system.

Figure 2A:
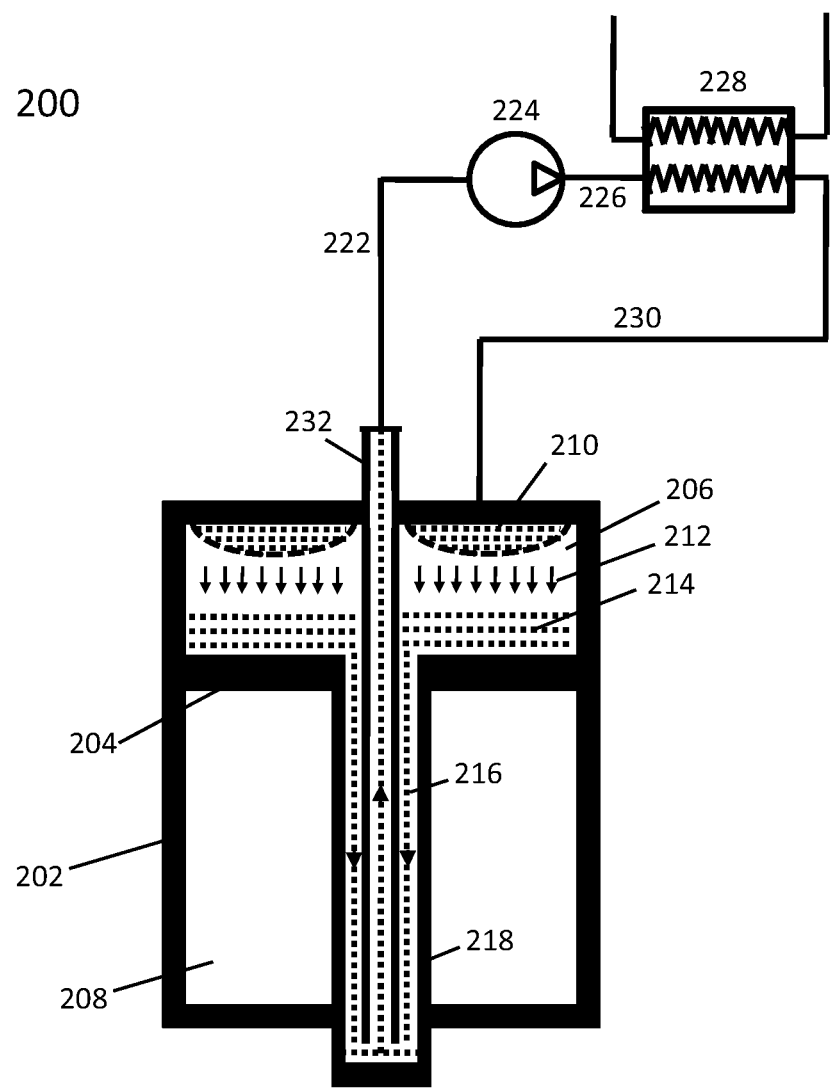
FIG. 2A is a schematic drawing of a pneumatic expander-compressor through which a heat-exchange liquid may be circulated without employment of a flexible hose in accordance with various embodiments of the invention.

FIG. 2A depicts an illustrative system 200 in accordance with various embodiments of the invention that compresses or expands gas. System 200 includes a vertically-oriented cylinder 202 containing a mobile piston 204 that divides the interior of the cylinder 202 into a gas-filled chamber 206 and a liquid-filled (hydraulic) chamber 208. Alternatively, both chambers 206 and 208 may be gas-filled.

Spray head 210 (which may be annular in shape, as shown) may inject a spray 212 of liquid droplets into the upper chamber 206 of the cylinder 202. This spray 212 produces an accumulation of liquid 214 on top of piston 204. A port or ports (not shown) with associated pipes and valves (not shown) allows for gas to be admitted to or exhausted from chamber 206 as desired. A port or ports (not shown) with associated pipes and valves (not shown) allows for fluid to be admitted to or withdrawn from chamber 208 as desired.

The system 200 in FIG. 2A resembles the system 140 in FIG. 1B but for the means by which heat-exchange liquid 214 (148 in FIG. 1B) is conveyed from the upper chamber 206 to the components of system 200 external to the cylinder 202 (e.g., pump 224 and heat exchanger 228, corresponding to pump 154 and heat exchanger 143 in FIG. 1B). In FIG. 2A, a hollow straw 232 (e.g., a rigid metal tube, a flexible plastic tube, and/or a telescoping hollow cylinder) attached to the upper portion of cylinder 202 is aligned with, and partially inserted into, the center-drilled cavity 216 in the rod 218. Cavity 216 is sealed at its nether end. There is sufficient space around the straw 232 within the cavity 216 to allow liquid 214 to flow. During compression or expansion of gas in chamber 206, heat-exchange spray 212 may be injected into chamber 206. The liquid 214 accumulates on the upper surface of piston 204 and flows downward through the portion of the cavity 216 that surrounds the straw 232. Entering the nether end of the straw 232, the liquid 214 ascends through the straw 232 to a pipe 222 through which it passes to the pump 224. Exiting the pump 224, the liquid 214 passes through a pipe 226 to the heat exchanger 228. Exiting the heat exchanger 228, the liquid 214 passes through pipes 230, 231 to the upper portion of the cylinder 202, where it then enters the spray head 210 at a pressure (e.g., approximately 3,050 psi) somewhat higher than the pressure within chamber 206 (e.g., approximately 3,000 psi) and is injected into the upper chamber 206 as a spray 212. A complete circuit is thus provided for the heat-exchange liquid 214 that includes no flexible pipe or hose corresponding to hose 152 in FIG. 1B.

Figure 2B:
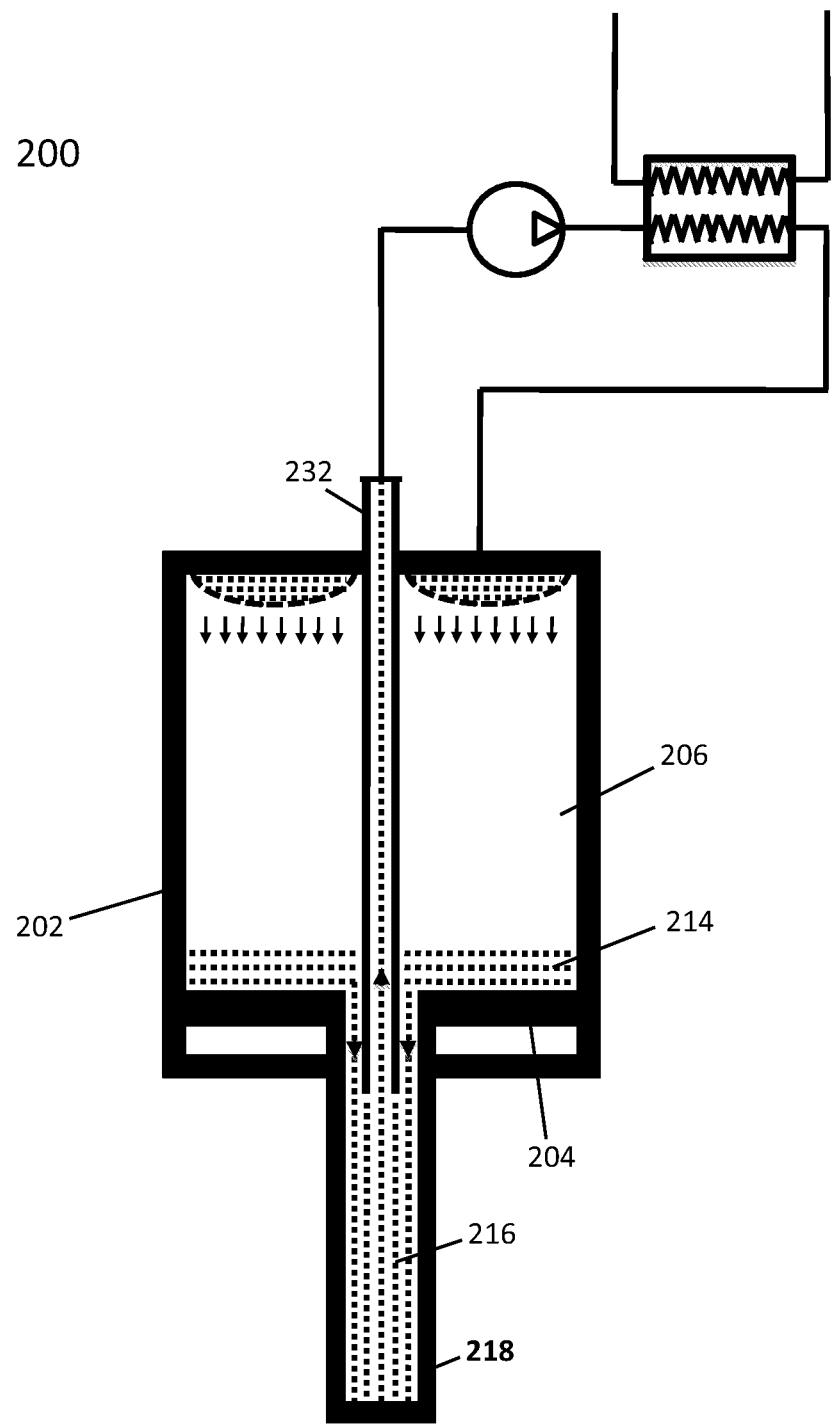
FIG. 2B depicts the system of FIG. 2A in a different state of operation.

FIG. 2B depicts another state of operation of the system 200 shown in FIG. 2A. In FIG. 2B, the piston 204 is near the bottom of the cylinder 202. This state of operation may occur when a quantity of gas in chamber 206 has just been expanded, or when a quantity of gas in chamber 206 is about to be compressed. The nether end of the straw 232 remains within the center-drilled cavity 216 of rod 218, and heat-exchange liquid 214 continues to flow upward through the straw 232 as in FIG. 2A. It will be clear to any person familiar with the art of pneumatic and hydraulic cylinders that system 200 depicted in FIGS. 2A and 2B may be operated in reverse, that is, to compress gas rather than expand it.

Figure 3:
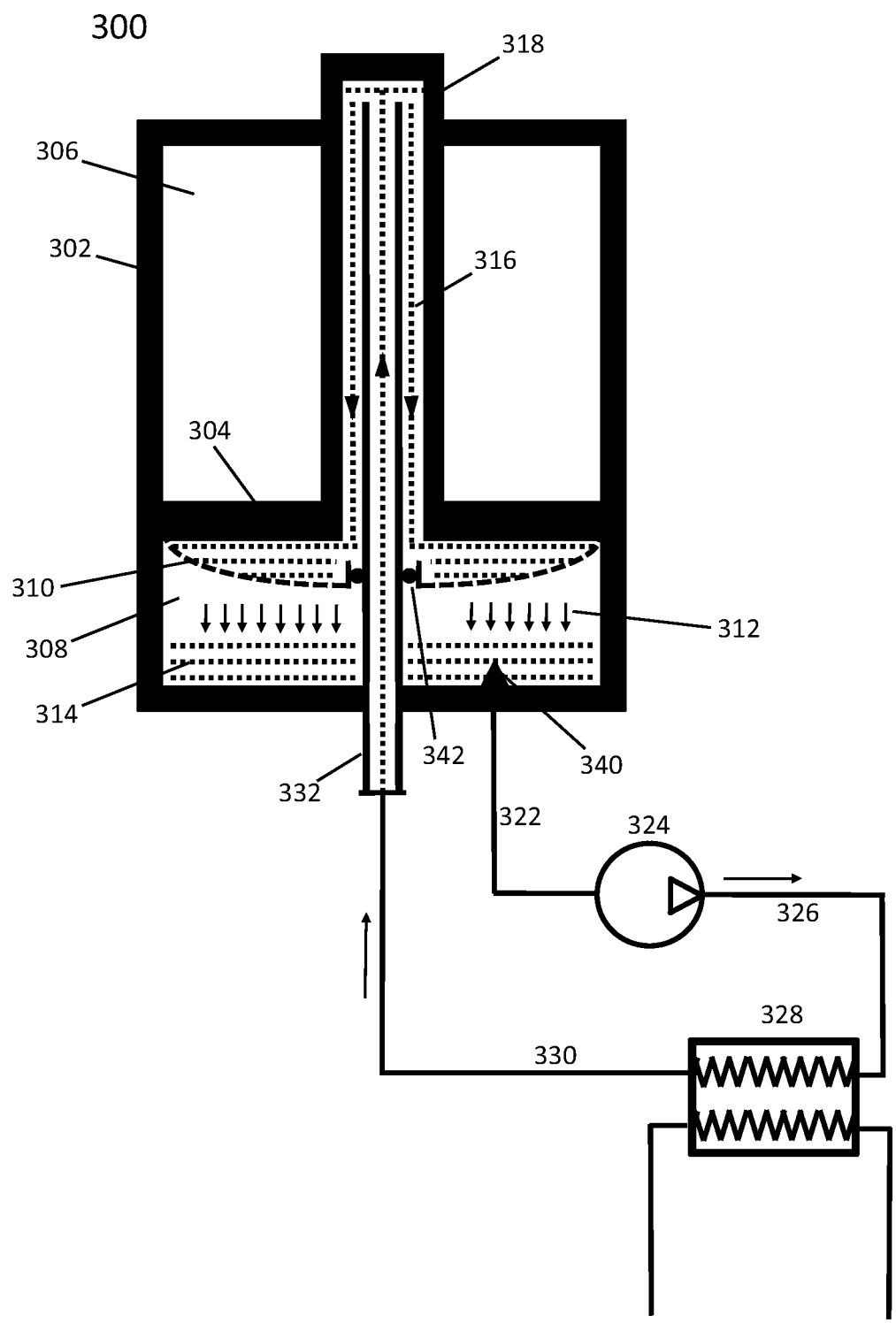
FIG. 3 is a schematic drawing of a pneumatic expander-compressor, different from that of FIG. 2A, through which a heat-exchange liquid may be circulated without employment of a flexible hose in accordance with various embodiments of the invention.

FIG. 3 depicts an illustrative system 300 in accordance with various embodiments of the invention that compresses or expands gas. System 300 includes a cylinder 302 (shown in an inverted vertical orientation with respect to FIG. 2A) containing a mobile piston 304 that divides the interior of the cylinder 302 into a gas-filled lower chamber 308 and a liquid-filled (hydraulic) upper chamber 306. Alternatively, both chambers 306 and 308 may be gas-filled. A port or ports (not shown) with associated pipes and valves (not shown) allows for gas to be admitted to or exhausted from chamber 308 as desired. A port or ports (not shown) with associated pipes and valves (not shown) allows for fluid to be admitted to or withdrawn from chamber 306 as desired.

In the state of operation of system 300 depicted in FIG. 3, an annular spray head 310 injects a spray 312 of liquid droplets into the lower chamber 308 of the cylinder 302. This spray 312 produces an accumulation of liquid 314 on the lower surface of chamber 308. This liquid 314 exits the cylinder 302 through a port 340 and is conveyed by a pipe 322 to the pump 324. Exiting the pump 324, the liquid 314 passes through a pipe 326 to a heat exchanger 328. Exiting the heat exchanger 328, the liquid 314 passes through a pipe 330 to the nether end of the straw 332. The liquid 314 ascends through the hollow interior of the straw 332 until it enters the center-drilled cavity 316 within rod 318. The liquid 314 then descends through the space surrounding the straw 332 within the cavity 316 and passes through the spray head 310 to re-enter the lower chamber 308 as a spray 312. The pressure (e.g., approximately 3,050 psi) within spray head 310 is somewhat higher than the pressure within chamber 308 (e.g., approximately 3,000 psi). A complete circuit is thus provided for the heat-exchange liquid 314 that includes no flexible pipe or hose corresponding to hose 152 in FIG. 1B.

The pressure of the heat-exchange liquid after pump 324, including within the straw 332, the cavity 316, and spray head 310, is, in system 300 in the state of operation depicted in FIG. 3, higher (e.g., approximately 50 psi higher) than the pressure within chamber 308. To prevent leakage and equalization of the pressures within the straw 332, the cavity 316, and the chamber 308, a seal 342 (capable of withstanding and maintaining at least, e.g., an approximate 50 psi differential pressure) is attached to the nether surface of the spray head 310 (or piston 304), surrounding the straw 332 and in contact with it.

In another embodiment of the invention, not depicted, a double-acting, vertically-aligned cylinder incorporates a straw mechanism similar to that depicted in FIGS. 2A and 2B to circulate heat-exchange liquid through its upper chamber and a straw mechanism with full differential pressure seal (similar to the low differential pressure seal that depicted in FIG. 3) to circulate heat-exchange liquid through its lower chamber. The two straw systems co-exist in a single pneumatic cylinder by employing two longitudinal cavities within the rod, one or both of which is not center-drilled (i.e., coaxial with the rod). In a state of operation where gas is being expanded or compressed in the upper chamber, the straw mechanism in liquid communication with the upper chamber may be operated in conjunction with an external pump and heat exchanger (as in FIGS. 2A and 2B) so as to warm (during expansion) or cool (during compression) the gas within the upper chamber. In a state of operation where gas is being expanded or compressed in the lower chamber, the straw mechanism in liquid communication with the lower chamber may be operated in conjunction with a second external pump and heat exchanger (as in FIG. 3) so as to warm (during expansion) or cool (during compression) the gas within the lower chamber. A series of appropriate states of operation allows such a pneumatic cylinder system to compress or expand gas continuously except for those brief intervals during which the piston reverses its direction of motion. In such a two-straw, double-acting cylinder system, provision may be needed to prevent free rotation of the rod, which might cause the walls of one or both rod cavities to impinge upon the straws within them. During compression or expansion of gas in either chamber of the cylinder, a complete circuit may be provided for the heat-exchange liquid that includes no flexible pipe or hose corresponding to hose 152 in FIG. 1B.

Figure 4:
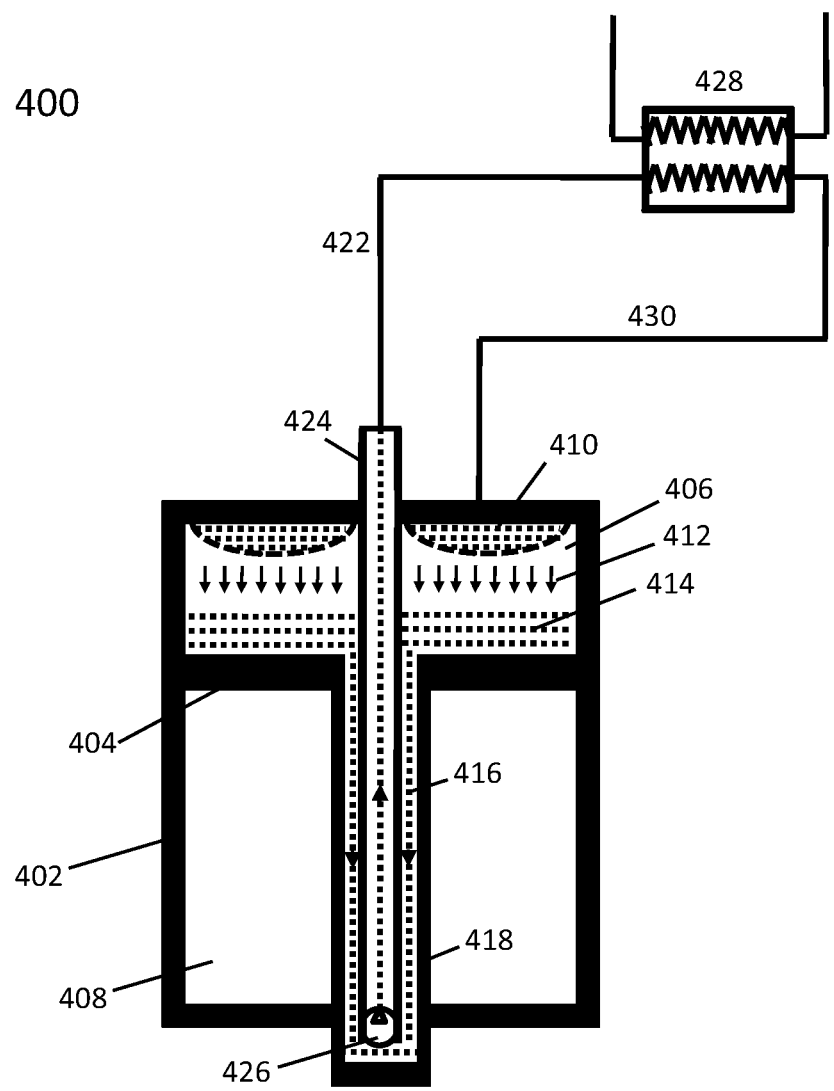
FIG. 4 is a schematic drawing of a pneumatic expander-compressor through which a heat-exchange liquid may be circulated by an internal pump in accordance with various embodiments of the invention.

FIG. 4 depicts an illustrative system 400 that resembles the system 200 in FIG. 2A but for the means by which heat-exchange liquid 414 (214 in FIG. 2A) is conveyed from the upper chamber 406 (206 in FIG. 2A) to the components of system 400 external to the cylinder 402 (e.g., heat exchanger 428 corresponding to heat exchanger 228 in FIG. 2A). In FIG. 4, an internal pump 424 (e.g., submersible bore pump, axial flow pump, or other in-line type pump) attached to the upper portion of cylinder 402. The pump 424 is disposed within cylinder 402 in the same manner that the straw 232 is disposed within the cylinder 202 in FIG. 2A: like the straw 232 in FIG. 2A, the pump 424 is aligned with, and partially inserted into, the center-drilled cavity 416 in the rod 418. There is sufficient space around the outer casing of pump 424 within the cavity 416 to allow liquid 414 to flow through the portion of the cavity 416 surrounding the pump 424. The intake or intakes of pump 424 (i.e., the openings in the outer casing of pump 424 through which liquid 414 enters the pump 424) are located sufficiently close to the nether end of the pump 424 so that the intake or intakes of pump 424 are immersed in liquid 414 in all states of operation of system 400 which include an accumulation of liquid 414 on the upper surface of piston 404 and within the cavity 416. In other words, the intake of pump 424 is immersed in liquid 414 during all normal operating states of system 400, regardless of the position of piston 404 and rod 418.

In FIG. 4, a pump mechanism 426 is depicted as located at the nether end of the pump 424, with its intake or intakes at the extreme nether end of the pump 424. In other embodiments, the pump mechanism 426 may be located elsewhere within, or may be coextensive with, the length of pump 424, and the intake or intakes of pump 424 may be located at points along pump 424 other than, or in addition to, its extreme nether end.

In the state of operation of system 400 depicted in FIG. 4, an annular spray head 410 injects a spray 412 of liquid droplets into the upper chamber 406 of the cylinder 402. This spray 412 produces an accumulation of liquid 414 on the upper surface of piston 404. This liquid 414 exits the cylinder 402, and is conveyed through cavity 416 by an internal pump 424. The internal pump 424 pumps the liquid 414 through pipe 422 into heat exchanger 428. Exiting the heat exchanger 428, the liquid 414 passes through pipes 430, 431 and the upper surface of cylinder 402 to spray head 410. The liquid 414 then passes through the spray head 410 to re-enter the upper chamber 406 as a spray 412. The pressure (e.g., approximately 3,050 psi) within spray head 410 is somewhat higher than the pressure within chamber 406 (e.g., approximately 3,000 psi). A complete circuit is thus provided for the heat-exchange liquid 414 that includes no flexible pipe or hose corresponding to hose 152 in FIG. 1B.

Figure 5:
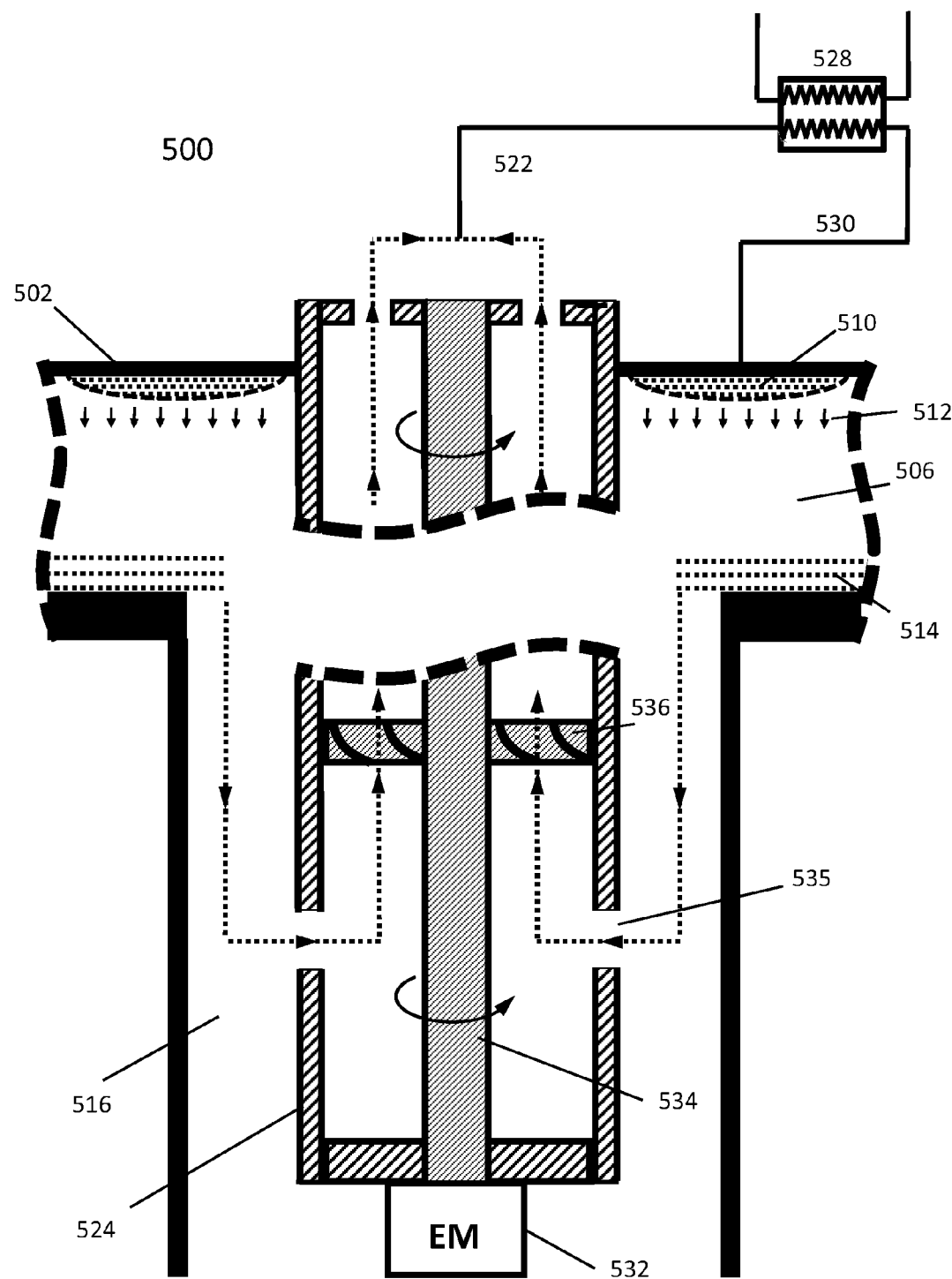
FIG. 5 is a schematic drawing of a system similar to that shown in FIG. 4, in which the internal pump is an internal submersible bore pump.

FIG. 5 is an enlarged schematic of a system 500 similar to system 400 shown in FIG. 4, with emphasis on the internal pump 524 (424 in FIG. 4). In system 500 depicted in FIG. 5, internal pump 524 is shown as a submersible bore pump; however, an internal axial flow pump or other in-line style pump may be used.

The state of operation of system 500 depicted in FIG. 5 is the same as that of system 400 depicted in FIG. 4. The accumulated heat-exchange liquid 514 (414 in FIG. 4) in chamber 506 (406 in FIG. 4) is conveyed through cavity 516 (416 in FIG. 4) by an internal pump 524 (424 in FIG. 4). An electric motor 532 rotates the internal pump shaft 534 to convey the liquid 514 through the inlet of the pump 524. Motor 532, illustrated in FIG. 5 attached below the shaft 534, may be located anywhere along shaft 534 including at the top of the shaft. The liquid 514 passes through a pump impeller 536 (the first stage of the pump) and ascends through the shaft of the internal pump 524. The internal pump 524 may have multiple stages (e.g., multiple impellers) depending on the size and pressure requirements of the system. The liquid 514 exits the internal pump 524, and passes through pipe 522 to heat exchanger 528. Exiting the heat exchanger 528, the liquid 514 passes through pipes 530, 531 and the upper surface of cylinder 502 to spray head 510. The liquid 514 then passes through the spray head 510 to re-enter the upper chamber 506 as a spray 512. Because the internal pump 524 is generally in constant contact with the heat-exchange liquid 514, the amount of air within the fluid circulation system is reduced, and overall circulation efficiency is improved.

The pneumatic cylinders shown herein may be outfitted with an external gas heat exchanger instead of or in addition to liquid sprays. An external gas heat exchanger may also allow expedited heat transfer to or from the high-pressure gas being expanded (or compressed) in the cylinders. Such methods and systems for isothermal gas expansion (or compression) using an external heat exchanger are shown and described in the U.S. Pat. No. 7,802,426, the disclosure of which is hereby incorporated by reference herein in its entirety.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

Embodiments of the invention may, during operation, convert energy stored in the form of compressed gas and/or recovered from the expansion of compressed gas into gravitational potential energy, e.g., of a raised mass, as described in U.S. patent application Ser. No. 13/221,563, filed Aug. 30, 2011, the entire disclosure of which is incorporated herein by reference.

Systems in accordance with embodiments of the invention may utilize a substantially incompressible fluid and/or one or more pressurized reservoirs to minimize or eliminate dead space within one or more cylinder assemblies, as described in U.S. patent application Ser. Nos. 13/080,910 and 13/080,914, filed Apr. 6, 2011, the entire disclosure of each of which is incorporated herein by reference. As also described in these applications, embodiments of the invention may incorporate mechanisms for substantially preventing the flow of gas from the cylinder assembly into the heat-exchange components (e.g., heat exchangers, pumps, and/or pipes connected thereto and/or between the cylinder assembly and such components), and may thereby substantially prevent formation of dead space in the heat-exchange components. For example, various embodiments incorporate one or more check valves on the upstream side of one or more of the nozzles in the spray mechanism introducing heat-exchange fluid into a cylinder assembly.

In various embodiments of the invention, the heat-exchange fluid utilized to thermally condition gas within one or more cylinders incorporates one or more additives and/or solutes, as described in U.S. patent application Ser. No. 13/082,808, filed Apr. 8, 2011 (the '808 application), the entire disclosure of which is incorporated herein by reference. As described in the '808 application, the additives and/or solutes may reduce the surface tension of the heat-exchange fluid, reduce the solubility of gas into the heat-exchange fluid, and/or slow dissolution of gas into the heat-exchange fluid. They may also (i) retard or prevent corrosion, (ii) enhance lubricity, (iii) prevent formation of or kill microorganisms (such as bacteria), and/or (iv) include a defoaming agent, as desired for a particular system design or application.

Embodiments of the invention may also feature spray-mechanism designs described in U.S. patent application Ser. Nos. 13/105,986 and 13/105,988, filed May 12, 2011, the entire disclosure of each of which is incorporated herein by reference, e.g., spray mechanisms configured to fill substantially all of the volume of a cylinder with overlapping sprays of heat-exchange fluid. As also described in these applications, embodiments of the invention may control the number of nozzles of a spray mechanism actively spraying heat-exchange fluid based on, e.g., the pressure inside the cylinder assembly, rather than merely increasing a volumetric flow of heat-exchange fluid through the nozzles. Embodiments may utilize multiple groups of nozzles (of similar or different designs), more of which are utilized as the pressure within the cylinder assembly increases.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A compressed gas energy storage and recovery system comprising:
    a cylinder assembly comprising (i) a first compartment, (ii) a second compartment, (iii) a piston, slidably disposed within the cylinder assembly, separating the compartments, and (iv) a piston rod coupled to the piston and extending outside the first compartment, the piston rod comprising a cavity (a) in fluid communication with the second compartment and (b) not fluidly connected to the first compartment;
    a compressed-gas storage reservoir;
    valving, selectively fluidly connecting the compressed-gas storage reservoir to the cylinder assembly, for admitting compressed gas into the second compartment for expansion or exhausting compressed gas from the second compartment after compression;
    a vent to atmosphere;
    valving, selectively fluidly connecting the vent to the cylinder assembly, for admitting gas into the second compartment for compression or exhausting expanded gas from the second compartment after expansion;
    a mechanism for introducing heat-exchange fluid within the second compartment; and
    a tube, configured for non-flexure and disposed at least partially within the cavity and in fluid communication with the mechanism, for facilitating recirculation of heat-exchange fluid from the second compartment to the cavity, from the cavity to the tube, from the tube to the mechanism, and from the mechanism to the second compartment.

2. The system of claim 1, wherein the tube is substantially rigid.

3. The system of claim 1, wherein the tube extends outside the second compartment.

4. The system of claim 1, wherein the tube is coaxially disposed within the cavity.

5. The system of claim 1, wherein the tube comprises an internal pump.

6. The system of claim 5, wherein the internal pump comprises at least one of a submersible bore pump, an axial flow pump, or an in-line-type pump.

7. The system of claim 1, wherein the tube comprises a substantially hollow cylinder.

8. The system of claim 1, wherein the mechanism comprises a spray head.

9. The system of claim 8, wherein the spray head is annular and disposed around the tube.

10. The system of claim 1, further comprising a heat exchanger and an external circulation apparatus for circulating heat-exchange fluid from the second compartment through the heat exchanger and back to the second compartment.

11. The system of claim 1, further comprising a heat exchanger, the tube comprising an internal pump for circulating heat-exchange fluid from the second compartment through the heat exchanger and back to the second compartment.

12. The system of claim 1, wherein the tube is configured to remain stationary notwithstanding movement of the piston and piston rod during expansion or compression of a gas in the second compartment.

13. The system of claim 1, wherein the heat-exchange fluid comprises water.

14. A method for energy storage and recovery utilizing a cylinder assembly comprising (i) a first compartment, (ii) a second compartment, (iii) a piston, slidably disposed within the cylinder assembly, separating the compartments, and (iv) a piston rod coupled to the piston and extending outside the first compartment, the piston rod comprising a cavity (a) in fluid communication with the second compartment and (b) not fluidly connected to the first compartment, the method comprising:
    at least one of:
        (a) admitting compressed gas from a source of compressed gas into the second compartment,
        expanding the compressed gas within the second compartment,
        introducing heat-exchange fluid into the second compartment during expansion of the compressed gas,
        recirculating heat-exchange fluid (i) from the second compartment to the cavity, (ii) from the cavity to a tube, the tube being configured for non-flexure and disposed at least partially within the cavity, (iii) from the tube to the exterior of the second compartment, and (iv) into the second compartment, and
        venting expanded gas to ambient atmosphere; or
        (b) admitting gas from a vent to atmosphere into the second compartment,
        compressing the gas within the second compartment,
        introducing heat-exchange fluid into the second compartment during compression of the gas,
        recirculating heat-exchange fluid (i) from the second compartment to the cavity, (ii) from the cavity to a tube, the tube being configured for non-flexure and disposed at least partially within the cavity, (iii) from the tube to the exterior of the second compartment, and (iv) into the second compartment, and
        storing compressed gas within a compressed-gas storage reservoir.

15. The method of claim 14, further comprising thermally conditioning the heat-exchange fluid before it recirculates back to the second compartment.

* * * * *